United States Patent [19]
Kobayashi et al.

[11] Patent Number: 5,724,346
[45] Date of Patent: Mar. 3, 1998

[54] MEANS FOR MAINTAINING CONNECTABLE ACCESS POINTS OWING TO MOVEMENT OF A MOBILE STATION BETWEEN CELLS IN A WIRELESS LAN SYSTEM

[75] Inventors: Naofumi Kobayashi; Kiyotaka Shikata; Osamu Sekihata, all of Kawasaki, Japan

[73] Assignee: Fujitsu Limited, Kanagawa, Japan

[21] Appl. No.: 529,525

[22] Filed: Sep. 18, 1995

[30] Foreign Application Priority Data

Jan. 11, 1995 [JP] Japan ..................... 7-002481

[51] Int. Cl.$^6$ ..................................... H04J 3/02
[52] U.S. Cl. .................. 370/329; 370/349; 370/401; 379/58
[58] Field of Search .................... 370/329, 337, 370/338, 347, 349, 401, 402, 403; 379/58, 59, 60, 61, 212; 455/33.1, 33.2, 34.1

[56] References Cited

U.S. PATENT DOCUMENTS

| | | | |
|---|---|---|---|
| 5,200,996 | 4/1993 | Beierle | 379/212 |
| 5,428,636 | 6/1995 | Meier | 370/329 |
| 5,509,027 | 4/1996 | Vook et al. | 455/33.2 |
| 5,583,866 | 12/1996 | Vook et al. | 370/329 |
| 5,590,133 | 12/1996 | Billström et al. | 370/349 |

FOREIGN PATENT DOCUMENTS 5-327715  12/1995  Japan ..................... H04L 12/23

*Primary Examiner*—Douglas W. Olms
*Assistant Examiner*—Shick Hom
*Attorney, Agent, or Firm*—Helfgott & Karas, PC.

[57] ABSTRACT

A mobile user station periodically searches for a connectable access point and stores the address of a connectable access point that has been found in a master-station management table. When the mobile user station moves from one cell to another under these conditions, the state of communication with the old access point deteriorates. When the state of communication with the old access point deteriorates to such a degree that it becomes necessary for the mobile user station to connect to a new access point, the mobile user station sends a connection request to the access point stored in the master-station management table and performs communication via the new access point. As a result, when connection to a new access point becomes necessary owing to movement of the mobile user station between cells, the changeover between access points can be performed quickly without searching for an access point.

27 Claims, 32 Drawing Sheets

FIG.4

| BACKBONE LAN | ADDRESS |
|---|---|
| BACKBONE LAN $10_1$ | |
| BACKBONE LAN $10_2$ | |
| BACKBONE LAN $10_3$ | |
| - - - | - - - |

BPT

FIG.7

| CONNECTABLE ACCESS POINT ADDRESS (PAD) | COMMUNICATION ENVIRONMENT (RANKING) (CCL) | STATUS (STS) |
|---|---|---|
| | | |
| ⋮ | ⋮ | |

25

| USER STATION ADDRESS (CAD) | RECEPTION ALLOWED/ NOT ALLOWED (RIDT) | SENDING ADDRESS IN CASE OF RECEPTION ALLOWED IN PART (SAD) |
|---|---|---|
| - - - | RECEPTION ALLOWED IN PART | - - - |
| - - - | RECEPTION NOT ALLOWED |  |
| - - - | RECEPTION ALLOWED |  |
| ⋮ | ⋮ | ⋮ |

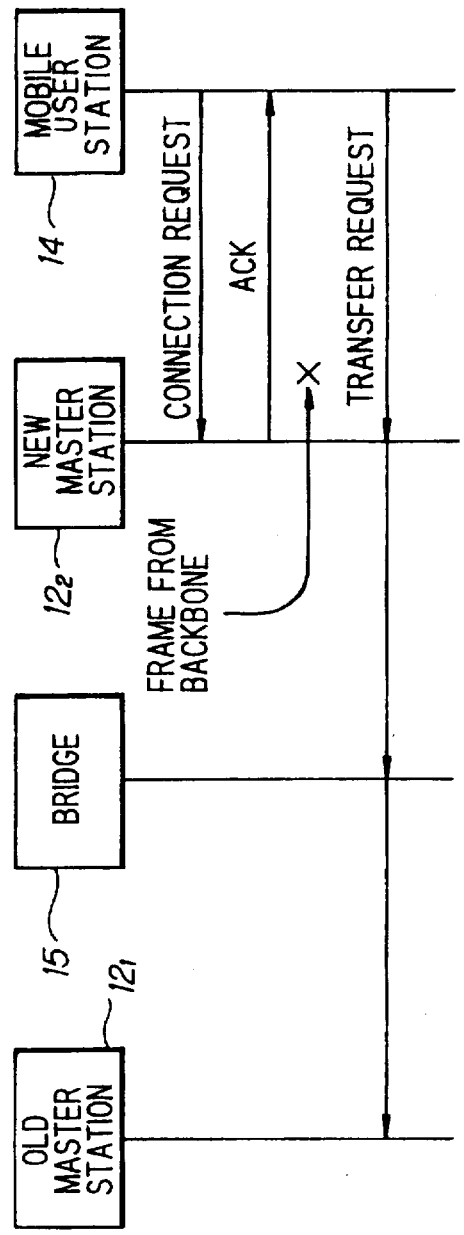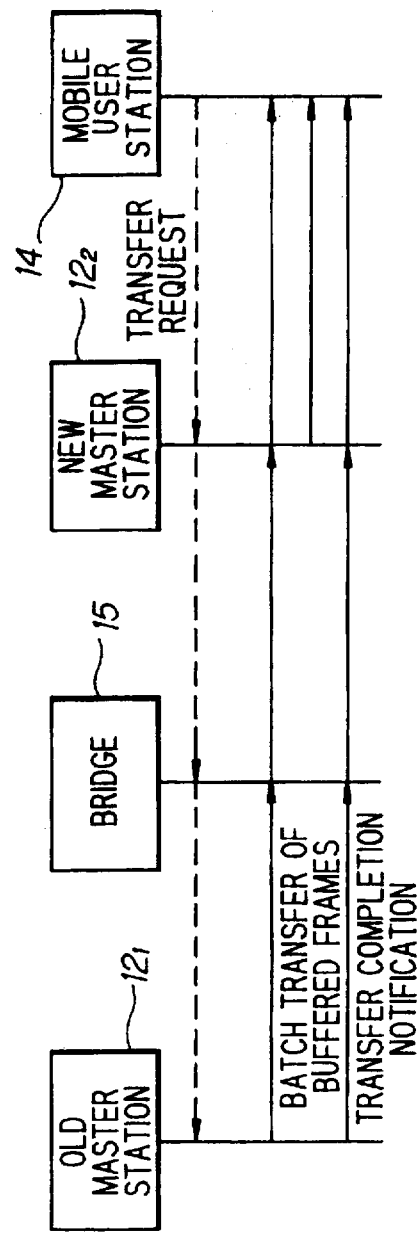

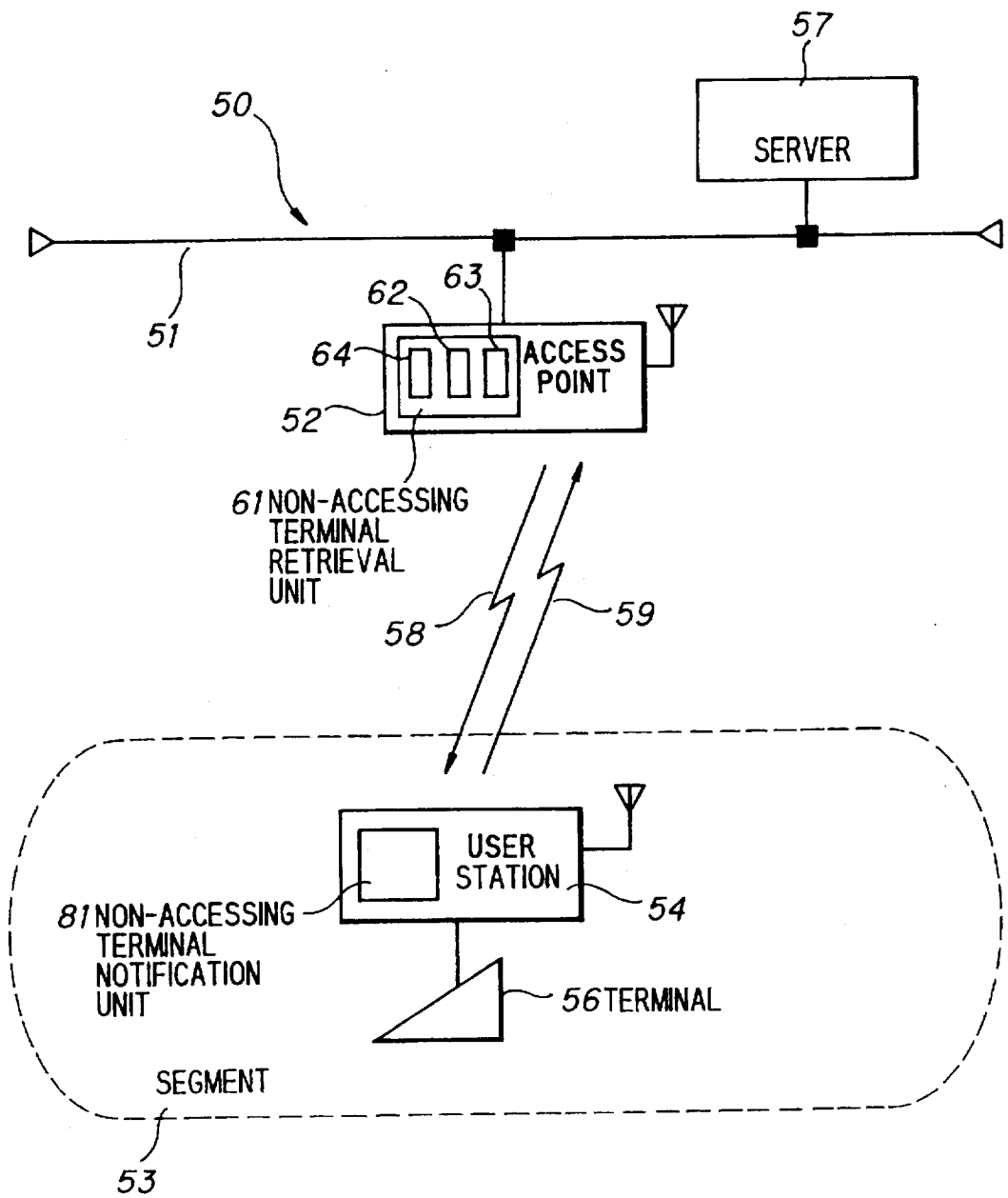

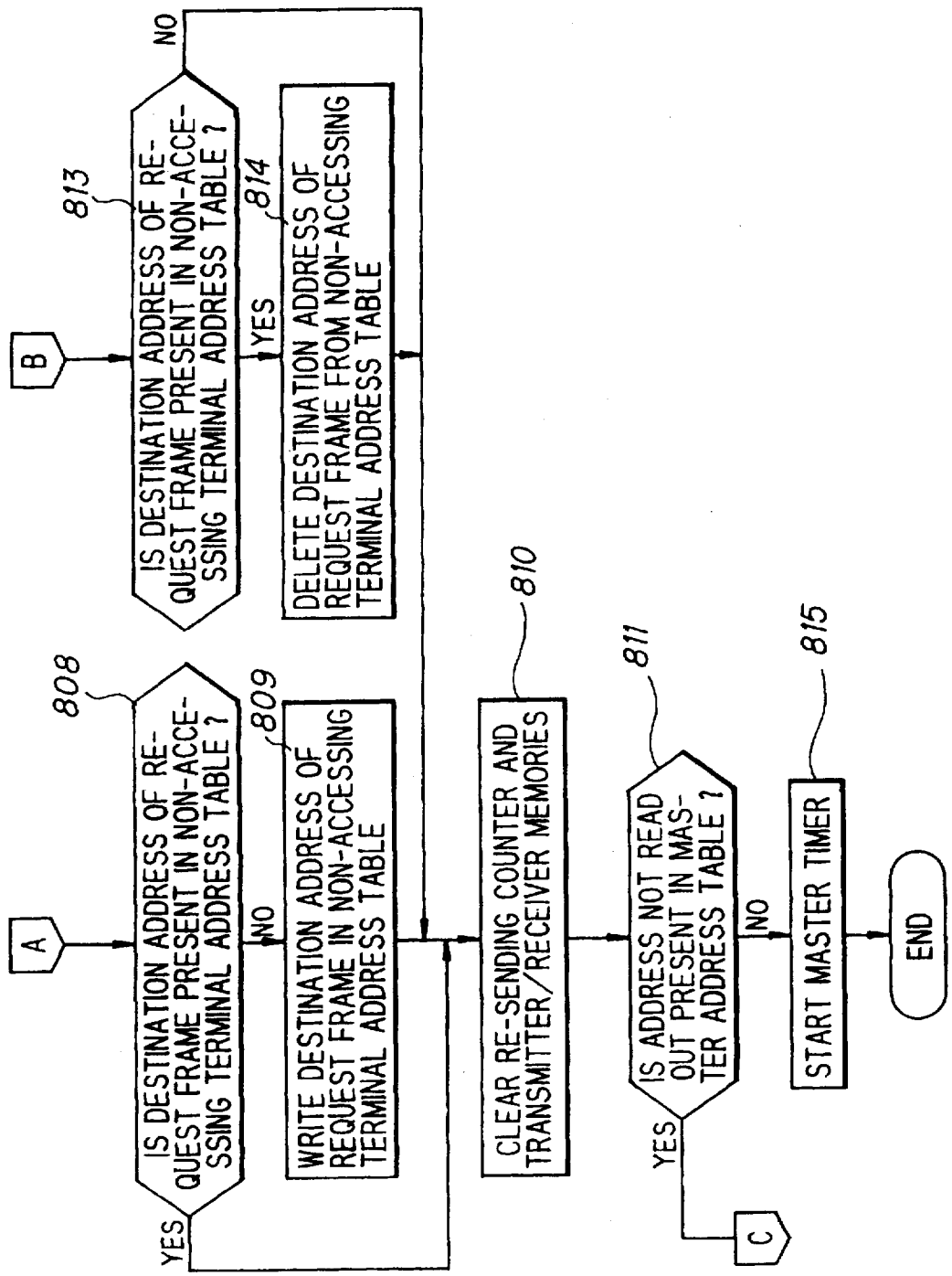

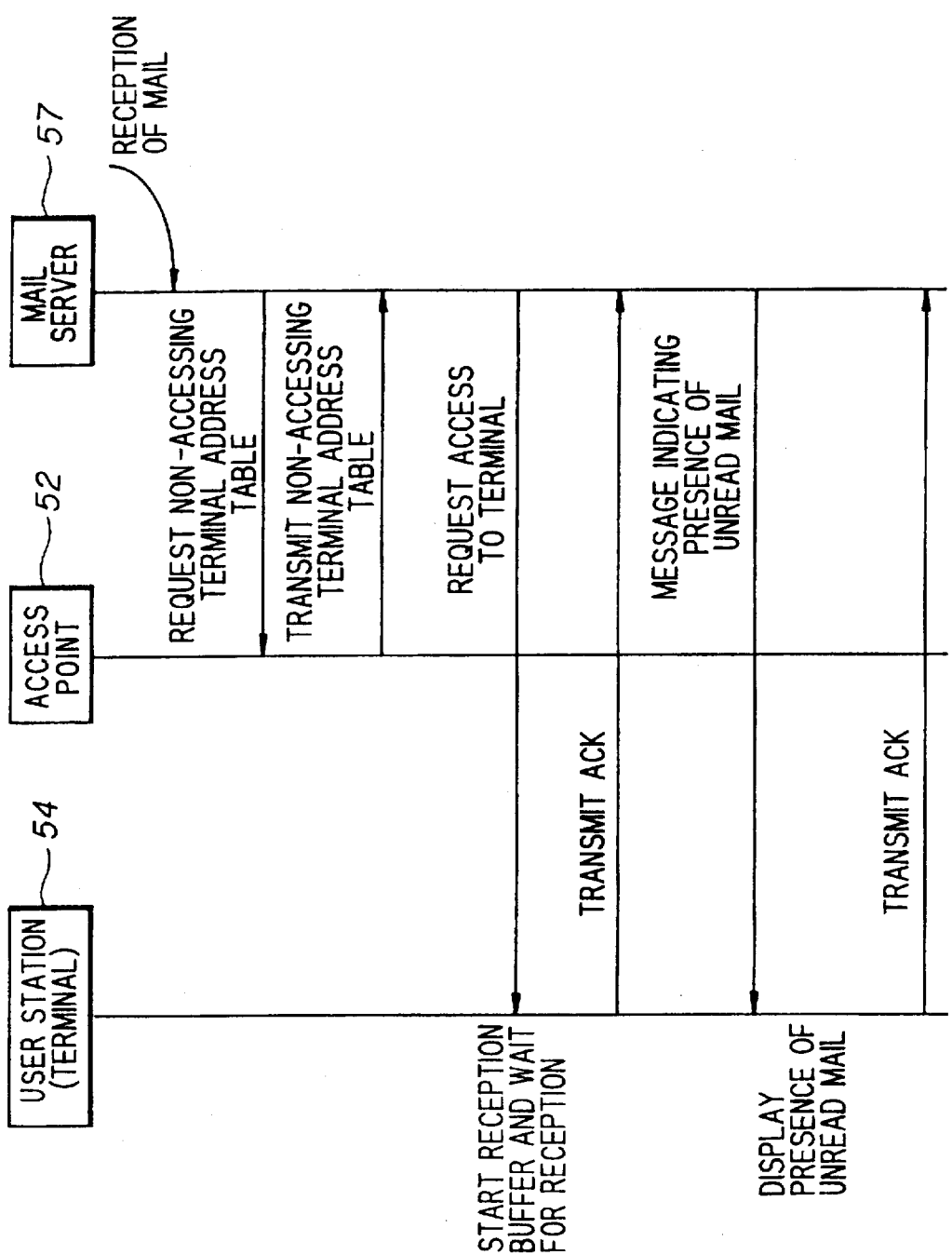

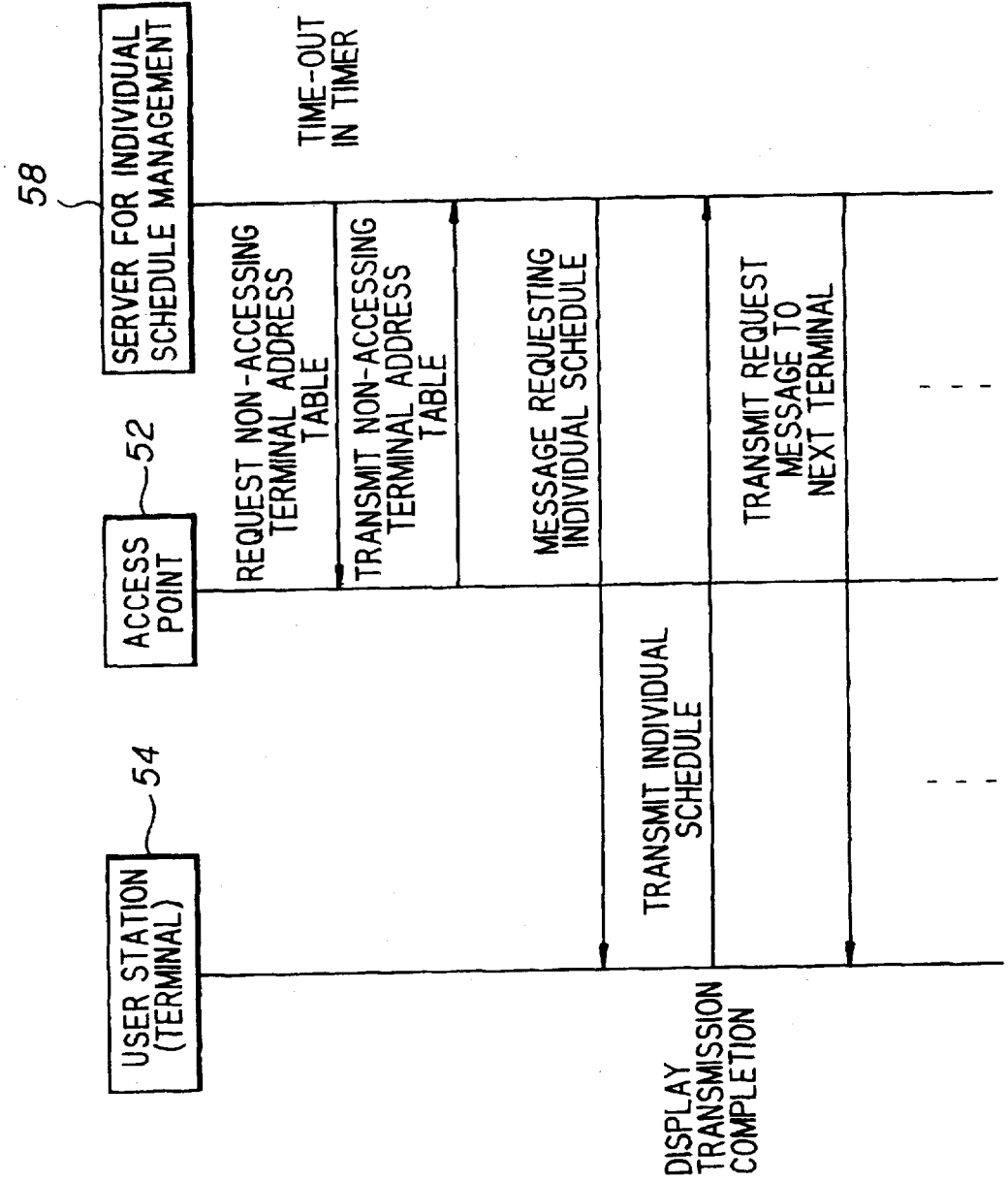

MEANS FOR MAINTAINING CONNECTABLE ACCESS POINTS OWING TO MOVEMENT OF A MOBILE STATION BETWEEN CELLS IN A WIRELESS LAN SYSTEM

BACKGROUND OF THE INVENTION

This invention relates to a wireless LAN system and, more particularly, to a wireless LAN system having access points connected to a backbone LAN and user stations connected to terminals for wirelessly sending and receiving signals to and from the access points.

Wireless LANs

Use of LANs is becoming increasingly popular at a rapid rate. A LAN allows data communication among a plurality of terminals, such as personal computers or work stations, installed at scattered locations at the same site, or between the terminals and a host computer, and allows programs and data files to be shared. Such a LAN basically is a wired LAN which connects each terminal or the host computer to basic cables (LAN cables) in the network.

When the number of terminals connected to the network in a wired LAN increases, the wiring laid within the room becomes very complicated. In a case where a terminal is portable, the advantage of portability is lost when the terminal is physically connected to the basic cable.

A wireless LAN has been proposed and is being put into practical use for the purpose of solving the aforementioned problems which arise with a wired LAN. In a wireless LAN, a backbone LAN is constructed by installing the basic cable ordinarily in a ceiling or the like and access points each having a wireless device capable of transmitting signals are attached to the basic cable. The access points are capable of transmitting and receiving signals to and from the basic cable. User stations (each having a wireless device) connected to terminals communicate with another user station and the backbone LAN wirelessly via the access point. In accordance with this wireless LAN, it is unnecessary to connect the slave terminals to the basic cable. This solves the wiring problems of the wired LAN and does not detract from the original features of a portable terminal.

Movement Between Cells in Wireless LANs

Efforts are being made to standardize such wireless LAN systems. However, many points remain unresolved in the sequence regarding management of mobile user stations, such as the search for a connectable access point by a user station, as well as the connection to a new access point, data transfer and a procedure for disconnection of a communication path to the old access point when a user station moves between cells. Consequently, the state of the art is such that free movement of user stations between cells is not possible. More specifically, without means for reliably implementing mobile slave-station management, it is not possible to fully exploit the principal advantage of a wireless LAN, namely the feasibility of communication with mobile units. It should be noted that the term "cell" refers to an area in which signals can be sent and received by a access point. In a wireless LAN, multiple cells are arranged in such a manner that adjoining cells of a plurality of access points partially overlap each other.

When it is attempted to connect a user station to a new access point by movement between cells in the prior art, a search for a connectable access point is performed immediately before the connection and connection procedures are taken after the connectable access point is found. However, the time needed to search for a connectable access point is on the order of several tens of milliseconds to one second, which is not a short period of time as far as LAN systems are concerned.

Further, in a method of moving between cells such as in the case of a car phone, connection to a new base station is performed after a disconnection to the base station governing the old cell. However, in a case where this method of performing the disconnection first is applied to a wireless LAN system, a buffer area for the mobile user station is released. As a consequence, data addressed to the mobile slave-station, which data has accumulated in the mobile slave-station buffer within the old access point, is discarded and transfer thereof is impossible. Moreover, a long period of time is needed for cutting of the communication path to the old access point to connection of the communication path to the new user station. This can lead to loss of data, addressed to the mobile user station, that arrives during this period of time.

Furthermore, in the prior art, management of the mobile user station is implemented by an exchange of frames between the old access point and the new access point. This is attended by problems.

In view of the foregoing, it is required that the three points mentioned below be satisfied in a case where a user station moves between cells in the conventional multiple-cell wireless LAN system.

Specifically, in a case where it becomes necessary for a mobile user station to move from a cell managed by a certain access point to a different cell and to be connected to a new access point, (1) it is required that the connection be made to a new access point for which the communication conditions are best in as short a time as possible in order to maintain good communications with the network; (2) it is required that the data that has accumulated in the buffer of the old access point dominant thus far be transferred to the mobile user station; and (3) it is required that the cutting of the communication path from the old access point be performed properly.

More specifically, when the mobile user station is connected to a new access point with the conventional method, the mobile user station searches for a connectable access point immediately before making a connection request. As a result, making the connection to the access point takes time.

Further, with the conventional method, data addressed to the mobile user station that has accumulated in the buffer of the old access point often is discarded at the time of the connect/disconnect procedure. This results in retransmission of data and increasing traffic of the network.

Furthermore, with the conventional method, processing for mobile slave-station management, such as a request for disconnection, is performed by an exchange of frames between the new and old access points. Consequently, when a user station moves between cells in a case where a network relay device having a bridge function is present between access points, a bridging path to the mobile user station through the interior of the network relay device is not switched over, data from the backbone LAN does not reach the mobile user station and, hence, the mobile user station cannot receive the data.

Ascertaining Non-Accessing Terminal in a Wireless LAN

LANs have become increasingly popular in recent years and a greater amount of data is being handled by such LANs.

However, all terminals in a certain segment are not necessarily accessing the LAN at all times. As a consequence, even if a message addressed to such a terminal is present in a server, such as a mail server, within this segment, the terminal cannot learn of the message promptly and transmission of the information is delayed as a result.

Further, schedule management software in a group functions to collect the daily schedules of the individuals within the group, create a list of everyone's schedule and search for dates that are convenient for all. Accordingly, schedule data of all individuals within a group in group schedule management software should be accumulated in the server. However, in order to transfer schedule data to a server, the terminals of the individuals must each access the LAN and a transfer procedure must be executed from the terminal side. This is a troublesome task.

Though groupware which operates on a LAN is becoming increasingly popular, the only terminals that the server is aware of are those accessing the LAN. This means that data on a LAN cannot be executed without accessing the LAN from a terminal. As a consequence, a mail server can neither give notification of a message nor automatically transfer the message to a terminal that is not accessing the LAN, even though the terminal is in use. In addition, a schedule server cannot accept individual schedule data that has been set in each terminal.

In order to eliminate a delay in message transmission and troublesome operations in a LAN, there are instances in which, when required, a session is established for a non-accessing terminal (namely a terminal to which power is being supplied but which is not accessing the LAN) from the side of the server connected to the LAN, after which transmission of a message or an automatic transfer operation is carried out. Establishing a session means establishing a path over which communication is possible. In order to establish a path between the server and a non-accessing terminal, it is essential to have a system which searches for non-accessing terminals within the segment under the supervision of the server, and which creates an address table of the non-accessing terminals.

SUMMARY OF THE INVENTION

A first object of the present invention is to make it possible for a mobile user station to rapidly perform a procedure for connecting to a new access point and disconnecting from an old access point and switch over the communication path in a short time when it is necessary to make a connection to the new access point owing to movement between cells, thereby data addressed to the mobile user station is prevented from discarding during a connection procedure.

A second object of the present invention is to prevent loss of data addressed to a mobile user station, which data is accumulated in the buffer of an old access point, by sending said data to the mobile user station.

A third object of the present invention is to make it possible to switch over, reliably and simply, the communication path of a network relay device such as a bridge to a mobile user station.

A fourth object of the present invention is to make it possible for a access point connected to a backbone LAN to automatically grasp non-accessing terminals within a segment, and to make it possible for a list of the non-accessing terminals to be communicated to a server when so requested by the server.

In accordance with the present invention, the first object is attained by providing a wireless LAN system comprising two or more access points connected to a LAN, each access point having a slave-station management table for managing user station addresses of user stations that are under its supervision, and user stations, connected to terminals, for wirelessly sending and receiving signals to and from the access points, the user station searching for a connectable access point when the user station moves, connecting itself to a new access point that has been found and subsequently sending signals to and receiving signals from the new access point, wherein the user station is provided with means for searching for a connectable access point before connection to the new access point is necessary, a master-station management table for holding the address of the connectable access point, and master/user station connection control means for sending a connection request to the access point held in the master-station management table when connection to the new access point becomes necessary.

In accordance with the present invention, the first and second objects of the invention are attained by providing a user station in a wireless LAN system for wirelessly sending and receiving signals to and from access points connected to a LAN, searching for a connectable new access point when the user station moves, connecting itself to the new access point and subsequently sending signals to and receiving signals from the new access point, wherein the user station is constituted by means for searching for a connectable access point in advance, a master-station management table for holding the address of the connectable access point, master/user station connection control means for sending a connection request to the access point held in the master-station management table when connection to the new access point becomes necessary, means which, after connection to the new access point has been established, is for sending a transfer request frame to the old access point via the new access point so as to request that data addressed to a mobile user station and accumulated in a buffer of the old access point be transferred to the mobile user station, means for sending a disconnection request to the old access point via the new access point in response to reception of notification of completion of transfer of the data, addressed to the mobile user station, from the old access point, and means for sending notification of the fact that reception is possible to the new access point after notification of disconnection is received from the old access point.

In accordance with the present invention, the first and second objects of the invention are attained by providing a access point in a wireless LAN system in which the access point is connected to a LAN for wirelessly sending and receiving signals to and from user stations that are under its supervision, wherein the access point is constituted by a slave-station management table for managing addresses of user stations that are under its supervision, connection control means for establishing a connection between the access point itself and a mobile user station in response to a connection request from the mobile user station, means for writing the address of the mobile user station that issued the connection request in the slave-station management table, means which, after the connection between the access point itself and the mobile user station has been established, relays to the mobile user station only those frames from a previously prevailing access point that are among frames addressed to said mobile user station and discards other frames addressed to the mobile user station, means for performing relay control of control frames between the mobile user station and the old access point, and means for relaying all frames addressed to the mobile user station after reception of notification of the fact that reception is possible sent from the mobile user station following cutting of a communication path to the old access point.

In accordance with the present invention, the third object of the invention is attained by interconnecting a plurality of LANs, providing a network relay having a table which stores, in correspondence with each LAN, the address of a user station or terminal under supervision, sending, by the network relay, a frame accepted from a prescribed LAN to a LAN to which a destination user station or terminal belongs upon referring to the table, and updating contents of the table based upon a transmission source address of a movement notification frame sent from the user station to the old access point via the new access point when the user station has moved.

In accordance with the present invention, the fourth object of the invention is attained by providing a wireless LAN system comprising access points connected to the LAN, and user stations connected to terminals for wirelessly sending and receiving signals to and from the access points, wherein the access point is provided with a non-accessing terminal address table for storing the address of a terminal (non-accessing terminal) to which power is being supplied from a power supply but which is not accessing the LAN, a master address table for registering the addresses of all terminals, which are the object of retrieval, in the non-accessing state, means for successively transmitting a request frame which includes a destination terminal address to user stations under supervision in accordance with stored contents of the master address table, and means for receiving a response frame which is sent from a user station in response to the request frame when the destination terminal is being supplied with power from a power supply but is not accessing the LAN and registering the address of the destination terminal in the non-accessing terminal address table.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 4 is a diagram showing the constitution of a bridge path table in a network relay (bridge);

FIG. 7 is a diagram showing the constitution of a master-station management table;

FIGS. 18A, 18B, 18C, 18D are diagrams for describing a changeover procedure;

FIG. 20 is a diagram showing a wireless LAN system according to a second embodiment of the invention;

FIG. 31 is a flowchart (part 2) of the processing executed by a access point in a second modification;

FIG. 32 is a diagram for describing the procedure of a service which automatically gives notice of the arrival of incoming mail; and FIG. 33 is a diagram for describing the procedure of a service for automatically collecting individual schedules.

Figure 1:
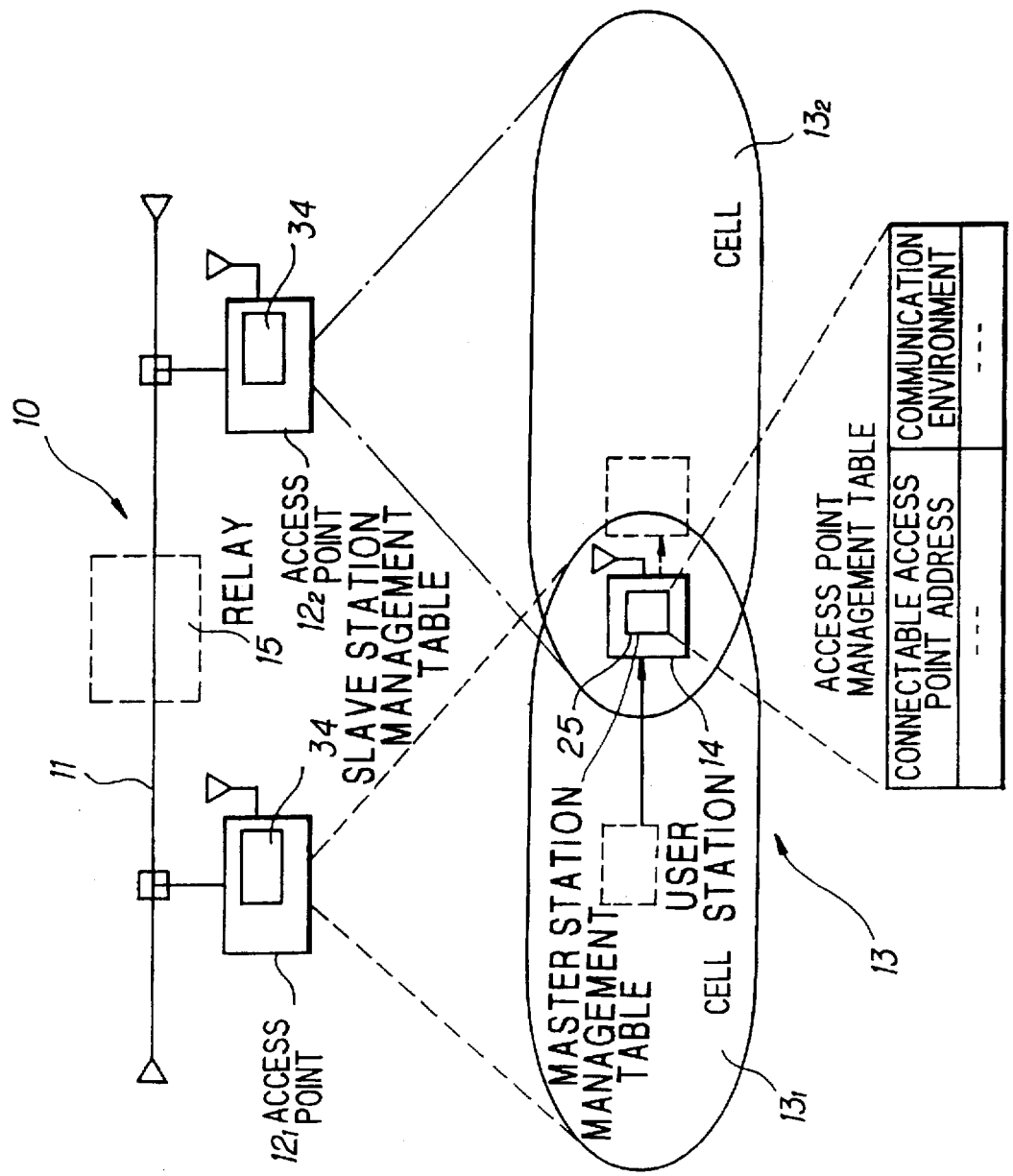
FIG. 1 is a diagram showing a first principle of the present invention.

DESCRIPTION OF THE PREFERRED EMBODIMENTS (A) Overview of Master-Station Changeover Control at Time of Movement Between Cells FIG. 1, which is a diagram for describing a first principle of the present invention, illustrates the configuration of a wireless LAN system having a function for controlling master-station changeover when a mobile user station moves between cells.

As shown in FIG. 1, the wireless LAN system includes a backbone LAN 10 having a basic cable 11 to which access points $12_1$, $12_2$ possessing a wireless sending/receiving function are connected at suitable locations. Numeral 13 denotes a multiple cell, namely cells $13_1$, $13_2$ corresponding to the access points $12_1$, $12_2$, respectively. Numeral 14 denotes a user station (mobile user station), which is connected to a terminal, for wirelessly sending signals to and receiving signals from a access point. The access points each have a slave-station management table 34 for storing the addresses of user stations under their control. The user station 14 has a master-station management table 25 for holding data (ranking, reception strength, etc.) which indicates connectable access points and their communication environments.

The mobile user station 14 retrieves a connectable access point periodically, for example, and stores the address of the found connectable access point is the master-station management table 25. This is done before the mobile user station moves from one cell to another. When the mobile user station 14 moves from cell $13_1$ to cell $13_2$ under these conditions, the state of communication between the mobile user station 14 and the old access point $12_1$ deteriorates. When the state of communication with the old access point deteriorates and it becomes necessary to connect to the new access point, the mobile user station 14 sends a connection request to the access point held by the master-station management table 25 and then communicates via the new access point $12_2$. Since the connectable access point is thus known in advance, the access points can be switched between in a short time without performing a time-consuming access point search operation. As a result, frames addressed to the mobile user station which arrive when the changeover between mobile user stations is made are not lost.

Further, the communication environments (e.g., the frame reception strengths) of access points are detected, access points for which the communication environment exceeds a predetermined threshold level are stored in the master-station management table 25, and data indicating the quality of the communication environment, or the ranking thereof, is stored in the table 25. When it becomes necessary to connect to a new access point, a connection request is sent from the access point having the best communication environment. If a connection is not established to any of the access points stored in the master-station management table 25 in this case, connectable access points are searched for anew, these are registered in the master-station management table 25 and connection requests are again sent in order from access points having good communication environments. If this arrangement is adopted, the access point corresponding to the cell to which the mobile user station has moved becomes the new access point and excellent communication can be performed thenceforth.

When it becomes necessary to connect to a new access point, the mobile user station 14 sends a connection request to the new access point $12_2$ while maintaining the communication path to the prevailing access point (old access point). In response to the connection request from the mobile user station 14, the new access point $12_2$ establishes a connection between itself and the mobile user station 14 and writes the address of the mobile user station that sent the connection request in the slave-station management table 34. Of the frames addressed to the mobile user station 14, the new access point $12_2$ relays to the mobile user station 14 only those frames from the old access point $12_1$; it discards the other frames addressed to the mobile user station. After the connection to the new access point $12_2$ is established, the mobile user station 14 sends the old access point $12_1$, via the new access point 122, a transfer request so as to request that data addressed to a mobile user station 14 and accumulated in a buffer of the old access point $12_1$ be transferred to the mobile user station 14 via the new access point $12_2$. In response to the transfer request, the old access point $12_1$ transfers to the mobile user station 14, in one batch or in frame units, the data addressed to the mobile user station accumulated in the buffer as well as notification of completion of the transfer, this being performed via the new access point $12_2$. The old access point discards subsequently arriving frames addressed to the mobile user station. In response to reception of notification of completion of transfer from the old access point $12_1$, the mobile user station 14 sends the old access point $12_1$ a disconnect request via the new access point $12_2$. In response to the disconnect request from the mobile user station, the old access point $12_1$ deletes the address of the mobile user station from the slave-station management table 34, cuts the communication path to the mobile user station and notifies the mobile user station 14 of disconnection via the new access point $12_2$. After receiving the notification of disconnection from the old access point $12_1$, the mobile user station 14 sends the new access point $12_2$ notification of the fact that reception is possible. Upon receiving such notification, the new access point $12_2$ subsequently relays to the mobile user station 14 all frames addressed to the mobile user station.

Thus, the mobile user station establishes communicating connection to the new access point while maintaining the communication path to the old access point, after which the mobile user station requests the old access point, via the new access point, to transfer data that is addressed to the mobile user station. After completion of the transfer, the mobile user station instructs the old access point to cut the communication path. As a result of this arrangement, data addressed to the mobile user station accumulated in the buffer of the old access point is not lost.

Since the connection between the mobile user station and the old access point is maintained when the connection between the mobile user station and the new access point is established, redundant paths come to exist between the mobile user station and the backbone LAN 10. However, of the frames addressed to the mobile user station 14, the new access point $12_2$ relays to the mobile user station 14 only the frames from the old access point $12_1$ and discards the other frames addressed to the mobile user station 14. This makes it possible to prevent erroneous operation due to the existence of redundant paths.

Furthermore, since the data addressed to the mobile user station 14 accumulated in the buffer can be transferred in one batch from the old access point $12_1$ via the new access point $12_2$, transfer time can be shortened. The data addressed to the mobile user station can also be transferred in frame units. In such case the backbone LAN is not occupied to the same extent as in batch transfer and the buffer of the new access point is not subjected to a heavy load.

There is also a case in which, rather than using the illustrated backbone LAN accommodating the old and new access points $12_1$, $12_2$, a network relay 15 (the block indicated by the dashed line in FIG. 1) is provided between LANs. In this case the network relay alters the content of an internally provided bridgepath table based upon the transmission source address of a movement notification frame (a data-transfer request frame, for example) which the mobile user station 14 sends to the old access point $12_1$ via the new access point $12_2$. As a result, even if the mobile user station moves between cells, the network relay 15 is capable of correctly sending frames, which are addressed to the mobile user station, to the backbone LAN to which this mobile user station belongs, and the mobile user station is capable of reliably receiving the frames addressed to it.

Further, after the connection to the new access point $12_2$ is established, the mobile user station 14 sends the movement communication frame to the old access point $12_1$ via the new access point $12_2$ so that (1) the data addressed to the mobile user station accumulated in the buffer of the old access point will be transferred to the mobile user station via the new access point and (2) the address of the mobile user station will be deleted from the slave-station management table 34. In response to reception of the movement notification frame, the old access point $12_1$ adds a transfer-completion notification frame onto the beginning of the accumulated data addressed to the mobile user station and then transfers the data in one batch or in frame units, wherein the frame gives notification of (1) the fact that the data transfer has been performed, and (2) the fact that the address has been deleted and the communication path to the mobile user station cut. If this arrangement is adopted, the mobile user station need transfer only one type of movement notification frame after the connection to the new access point is established. This makes it possible to shorten the time needed to change over between access points. Further, since the notification of completion of transfer can be received before the accumulated data addressed to the mobile user station is transferred, the notification of the fact that reception is possible can be sent to the new access point immediately so that all frames addressed to the mobile user station can be relayed.

In this case, the old access point monitors the amount of data addressed to the mobile user station accumulated in the buffer, performs batch transfer if the amount of data is less than a set value and performs transfer in frame units if the amount of data is greater than the set value. If this arrangement is adopted, the backbone LAN is occupied for a shorter period of time, the burden upon the new access point is alleviated and high-speed transfer of data can be achieved.

(B) Overview of Control for Ascertaining Non-Accessing Terminals

Figure 2:
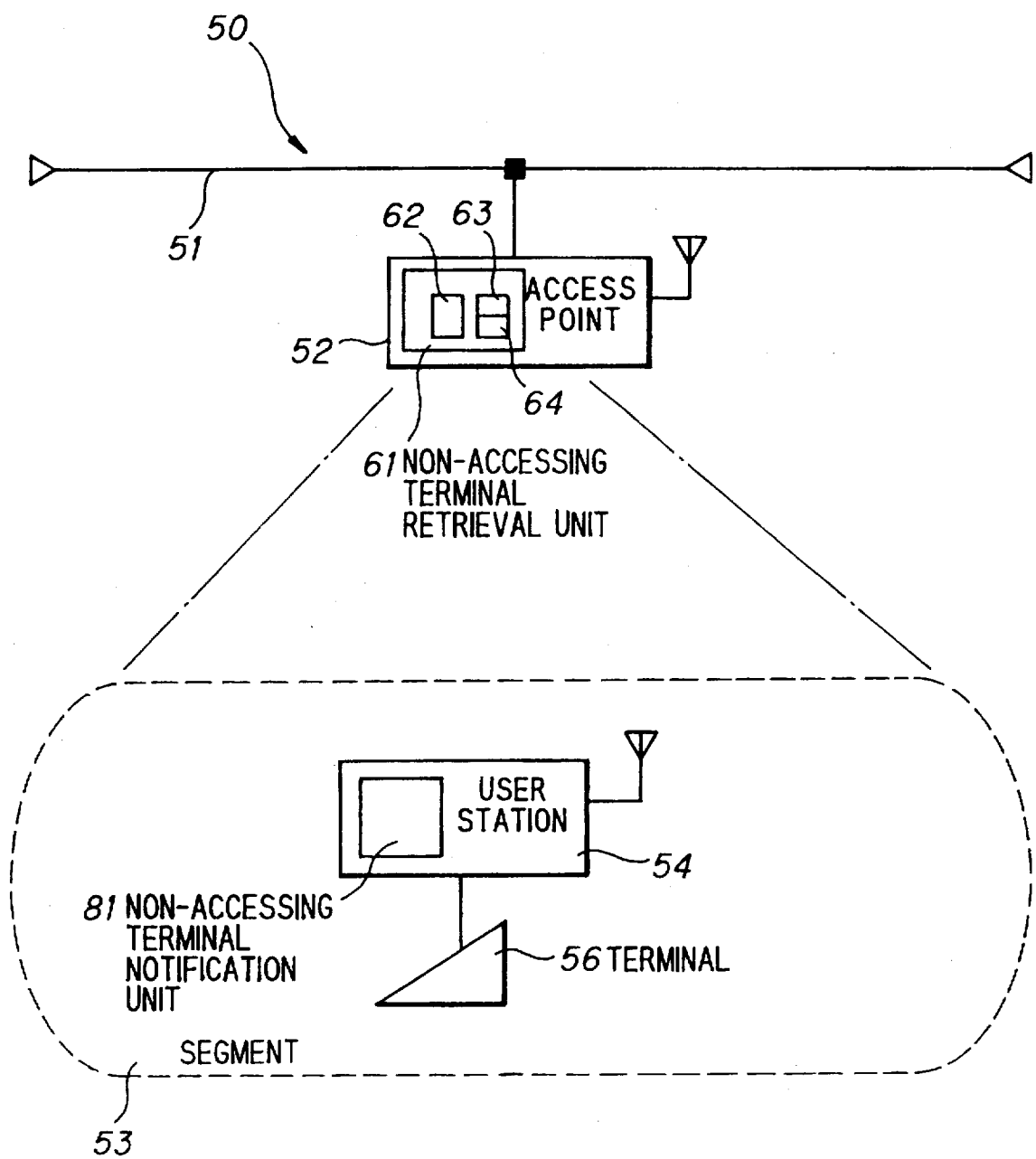
FIG. 2 is a diagram showing a second principle of the present invention.

FIG. 2, which is a diagram for describing a second principle of the present invention, illustrates the configuration of a wireless LAN system having a function for ascertaining non-accessing terminals within a segment.

As shown in FIG. 2, the wireless LAN system includes a backbone LAN 50 having a basic cable 51 to which a access point 52 possessing a wireless sending/receiving function is connected. Numeral 53 denotes a segment managed by the access point 52, 54 a user station, which is connected to a terminal, for wirelessly sending signals to and receiving signals from the access point 52. Numeral 56 denotes the terminal to which the mobile user station is connected. The access point 52 includes a non-accessing terminal retrieval unit 61 for controlling retrieval of non-accessing terminals and having a slave-station absence/presence management table 62 for managing absence/presence of user stations that are under the supervision of the access point, a master address table 64 in which the addresses of all terminals, which are the object of retrieval, in the non-accessing state are registered beforehand, and a non-accessing terminal address table 63 for registering non-accessing terminals. The user station 54 has a non-accessing terminal notification unit 81 for controlling notification of a non-accessing terminal.

(C) Control for Ascertaining Non-Accessing Terminals (FIG. 2)

The non-accessing terminal retrieval unit 61 of the access point 52 periodically sends the user station 54 under control a request frame which includes a destination address as a terminal address registered in the master address table 64. The non-accessing terminal notification unit 81 of the user station 54 sends the access point a response frame when the destination terminal contained in the request frame is being supplied with power from a power supply but is not accessing the LAN (i.e., when the destination terminal is in the non-accessing state). Upon receiving the response frame, the non-accessing terminal retrieval unit 61 of the access point 52 registers the address of the destination terminal in the non-accessing terminal address table 63.

By adopting this arrangement, the access point is capable of grasping all terminals that are in the non-accessing state within a segment. If there is an inquiry from a server, the access point is capable of immediately communicating a list of the non-accessing terminals to the server. As a result, the server can be informed of non-accessing terminals and is capable of executing processing for notifying terminals of whether a message is present or not, for automatically transferring messages and for accepting schedule data that has been set in the terminals.

When the terminal connected to the user station has accessed the LAN, the non-accessing terminal notification unit 81 sends the access point a delete frame which includes the address of the terminal. The non-accessing terminal retrieval unit 61 of the access point receives the delete frame transmitted from the user station, deletes the terminal address contained in the delete frame from the non-accessing terminal address table 63 and notifies the user station of reception of the delete frame. Adopting this arrangement makes it possible to accurately ascertain non-accessing terminals.

In response to introduction of power to the terminal connected to the user station 54, the latter activates the non-accessing terminal notification unit 81 to start the response-frame or delete-frame transfer function. Upon receiving a delete ACK frame, the user station 54 deactivates the non-accessing terminal notification unit 81 and halts the transfer function. This makes it possible to reduce the power consumed by the user station.

When the terminal has accessed the LAN, it does not transmit the delete frame. When the non-accessing terminal retrieval unit 61 of the access point receives an actual data frame, the unit 61 extracts the terminal address contained in the frame, registers this terminal address in the slave-station absence/presence management table 62 and can also delete this terminal address from the non-accessing terminal address table 63. If this arrangement is adopted, the user station under supervision can be managed accurately by the slave-station absence/presence management table 62 and a non-accessing terminal can be correctly grasped by the non-accessing terminal address table 63.

Furthermore, in a case where the response frame in answer to the request frame is not received, the access point re-sends the request frame a preset number of times. If the response frame still is not received, the access point deletes the address of the terminal from the non-accessing terminal address table 63 upon judging that the power supply of the terminal is not on or that terminal is no longer under its supervision because of movement. By adopting this arrangement, an address table of non-accessing terminals can be created in accurate fashion.

(D) First Embodiment of the Invention (a) Wireless LAN System

Figure 3:
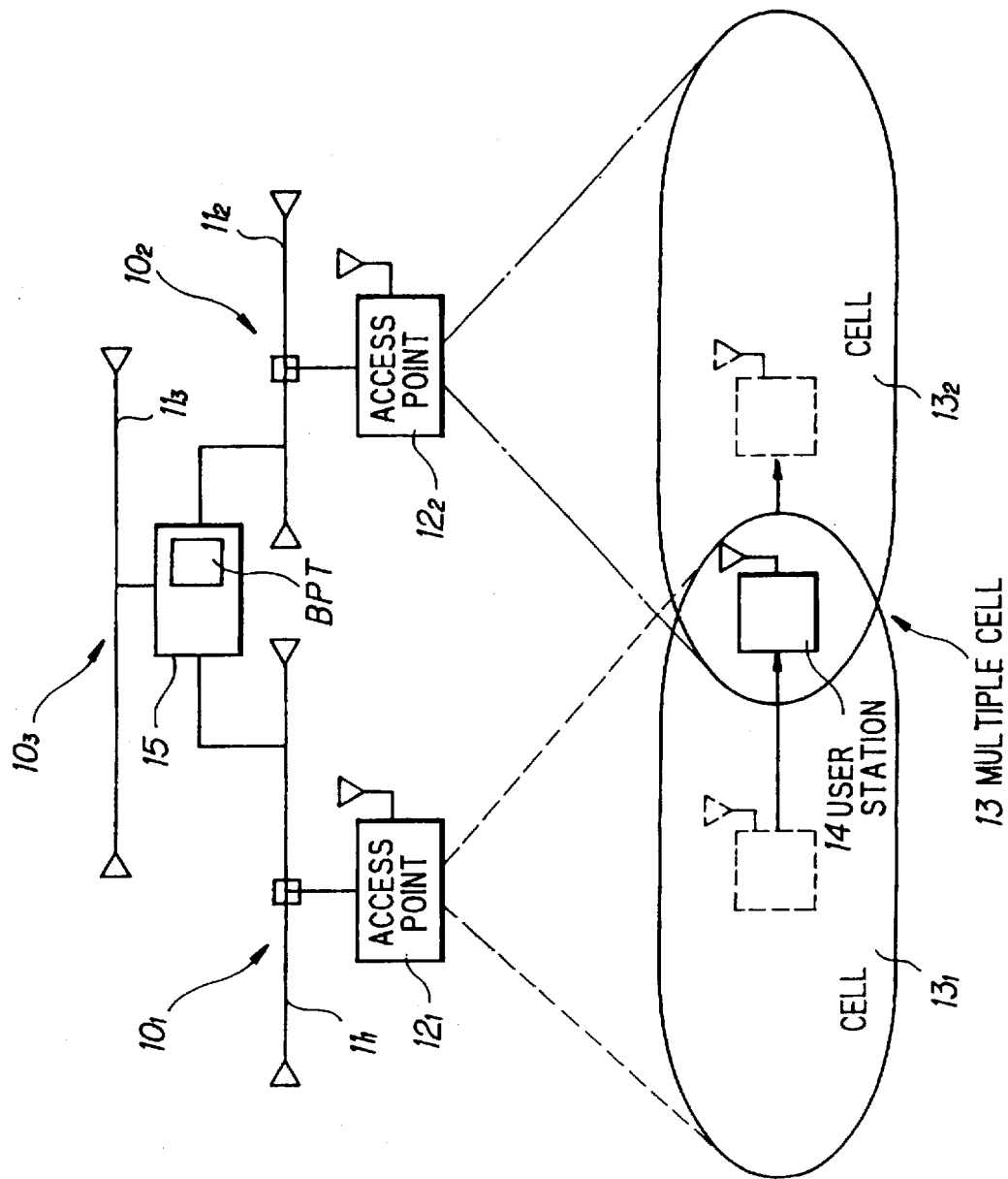
FIG. 3 is a diagram showing the configuration of a wireless LAN system according to a first embodiment of the invention.

FIG. 3 is a diagram showing the configuration of a wireless LAN system according to a first embodiment of the invention. The wireless LAN system includes backbone LANs $10_1$–$10_3$ having basic cables $11_1$–$11_3$, respectively. The access points $12_1$, $12_2$ having the wireless sending/ receiving function are connected to the respective backbone LANs $10_1$–$10_3$. Numeral 13 denotes the multiple cell, namely the cells $13_1$, $13_2$ corresponding to the access points $12_1$, $12_2$, respectively. Numeral 14 denotes the user station (mobile user station), which is connected to a terminal, for wirelessly sending signals to and receiving signals from a access point. The network relay 15 having the bridge function is provided between the backbone LANs.

As shown in FIG. 4, the network relay 15 has a table (a bridge path table) BPT which stores the address of the user station under supervision and the address of the access point in correspondence with each backbone LAN. Upon referring to the table BPT, the network relay 15 sends a frame accepted from a prescribed backbone LAN to the backbone LAN to which the user station that is the destination belongs. Depending upon the system, there are cases in which the access points $12_1$, $12_2$ are connected to the same backbone LAN without using the network relay 15, as illustrated in FIG. 1. Further, several access points may be connected to a backbone LAN, though only one is shown to be connected. Though only one user station is illustrated, a number thereof may exist in each cell. Certain user stations are immobile while the others are portable.

The backbone LANs $10_1$–$10_3$ are installed in a ceiling and the access points are connected to the basic cables $11_1$–$11_3$ at suitable locations. It is arranged so that cells partially overlap adjoining cells in such a manner that communication via LAN will not be interrupted when a user station is moved between cells while being carried about.

Figure 5A:
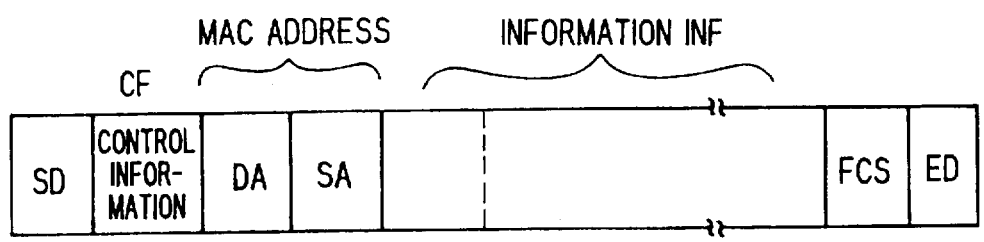
FIGS. 5A, 5B are diagrams showing the compositions of frames.
Figure 5B:
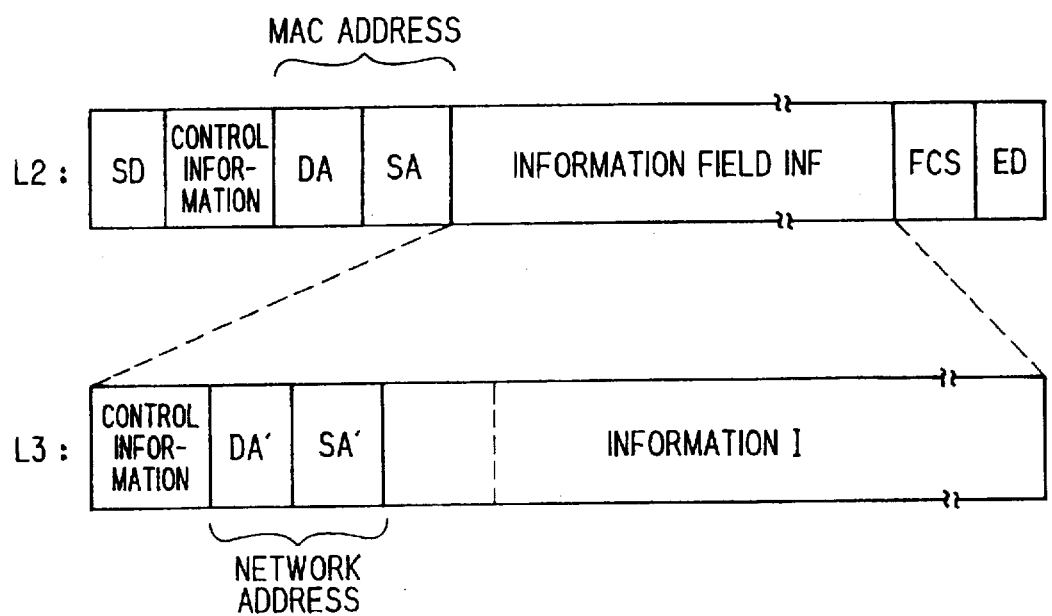

The frame used in a wireless LAN has a composition similar to that of the frame used in a wired LAN. FIG. 5A shows the composition of the frame. Specifically, a control field CF, a layer-2 MAC address (constituted by a destination address DA and a sending address SA), an information field INF and a frame checking sequence FCS are placed between a start delimiter SD and an end delimiter ED. The information field INF contains the type of frame and the data desired to be transmitted. The frame-shown in FIG. 5A has a frame composition suited to a bridge. FIG. 5B shows the composition of a frame suited to a router. The frame of FIG. 5B has the above-described frame composition but the information field INF is further subdivided into a control information field, a destination address DA', which is a network address, a sending address SA' and an information section I.

In FIG. 3, the user station 14 is under the supervision of the first access point $12_1$ and is accessing the backbone LAN $10_1$ via the access point $12_1$. When the user station 14 moves from the cell $13_1$ toward the cell $13_2$ under these conditions, the state of communication between the user station and the access point $12_1$ worsens. When the user station 14 approaches the boundary of cell $13_1$, the reception strength of the control frame outputted by the access point $12_1$ falls below a set level. When this occurs, the user station 14 establishes a connection with the new access point $12_2$, which now offers the best state of communication, and accesses the backbone LAN $10_2$ via the access point $12_2$.

(b) User Station (b-1) Construction

Figure 6:
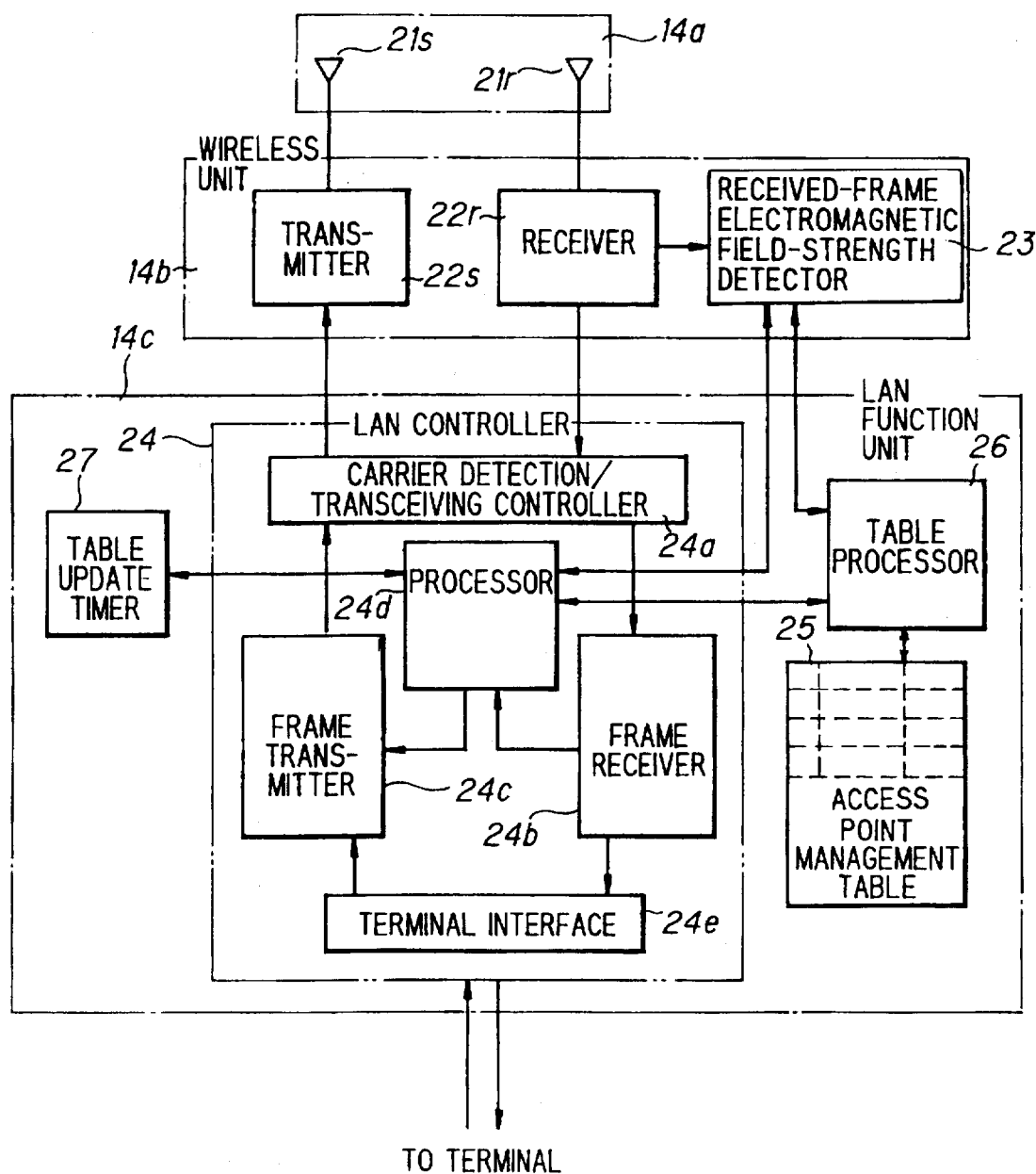
FIG. 6 is a block diagram showing the construction a user station.

FIG. 6 is a block diagram showing the construction a user station. The user station includes an antenna 14a, a wireless section 14b and a LAN function unit 14c. A transmitting antenna 21s and a receiving antenna 21r are provided as the antenna 14a, though an arrangement may be adopted in which these antennae are shared. The wireless section 14b includes a transmitter 22s, a receiver 22r and an electric field strength detector 23. The wireless section 14b receives a frame transmitted by the access point and detects the electric field strength of the received frame, thereby judging any worsening in the state of communication with the present access point. At the time of a search, the wireless section 14b is capable of finding other connectable access points in an excellent communication environment.

The LAN function unit 14c includes a LAN controller 24, the master-station management table 25 for storing the addresses of connectable access points obtained by search control, described later, as well as the quality of the communication environment of each connectable access point, a table processor 26 for updating the content of the master-station management table 25, and a table update timer 27 for causing periodic execution of processing to update the master-station management table 25.

As shown in FIG. 7, the master-station management table 25 stores addresses PAD of connectable access points, degrees or orders of priority CCL of communication environments and status STS (connection not tried; connection impossible; connection request in progress; connection in progress). A connectable access point is defined as one for which the reception field strength of the frame received from this access point is above a set level. Communication environment refers to the quality of the state of communication with the access point and is expressed by frame reception strength or ranking. As for the ranking method, a ranking table corresponding to reception strength is provided beforehand in the electric field strength detector 23 or table processor 26 in such a manner that a ranking of 1 is assigned if the reception strength falls within a certain range and a ranking of 2 if the reception strength is below this range, by way of example.

The LAN controller 24 includes a carrier detecting/transceiving controller 24a for detecting a carrier and controlling the sending/receiving of frames, a frame receiver 24b, a frame transmitter 24c, a processor 24d and a terminal interface 24e for interfacing the terminal.

(b-2) Control of User Station

Figure 8:
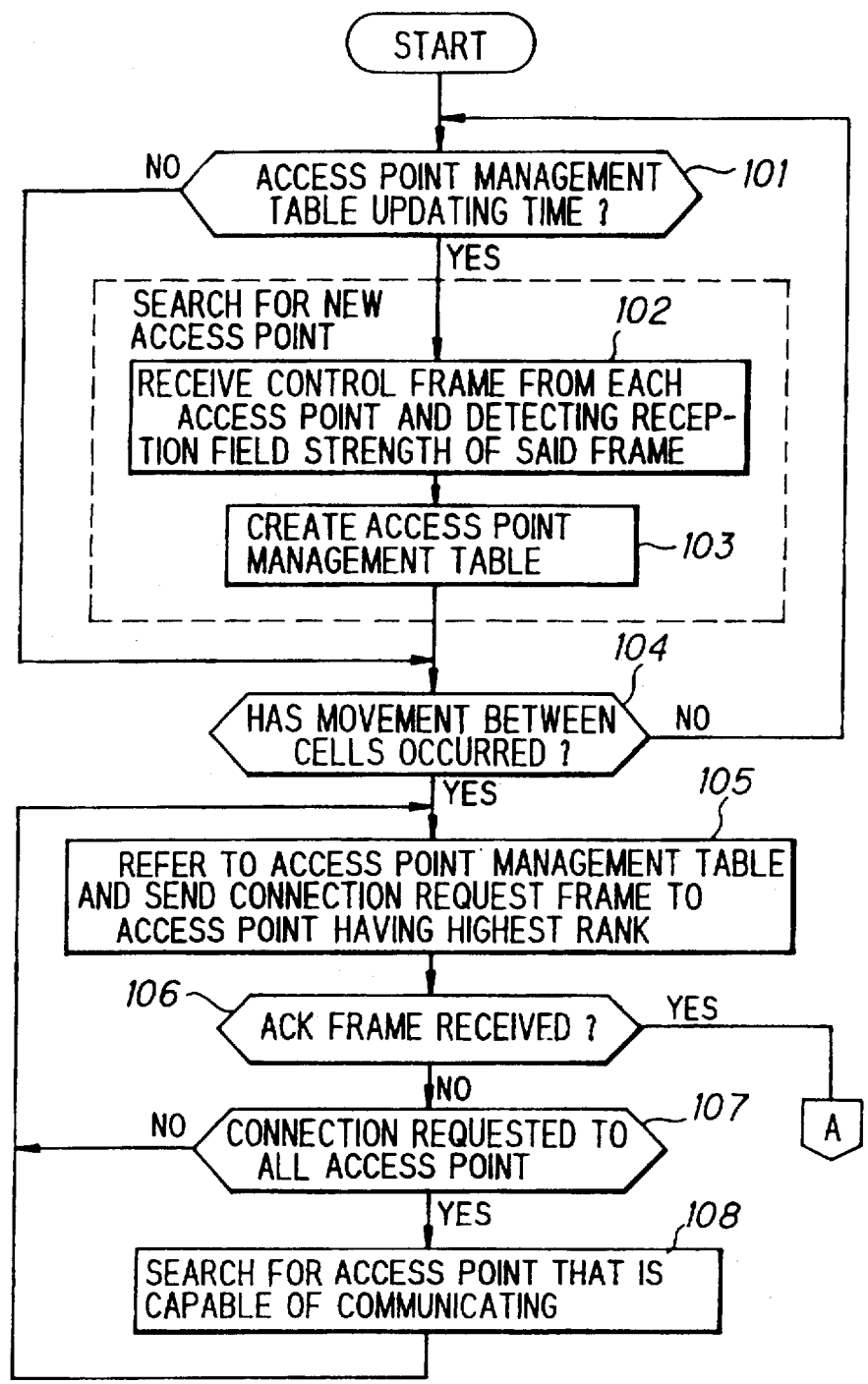
FIG. 8 is a flowchart (part 1) of the processing executed by the user station.
Figure 9:
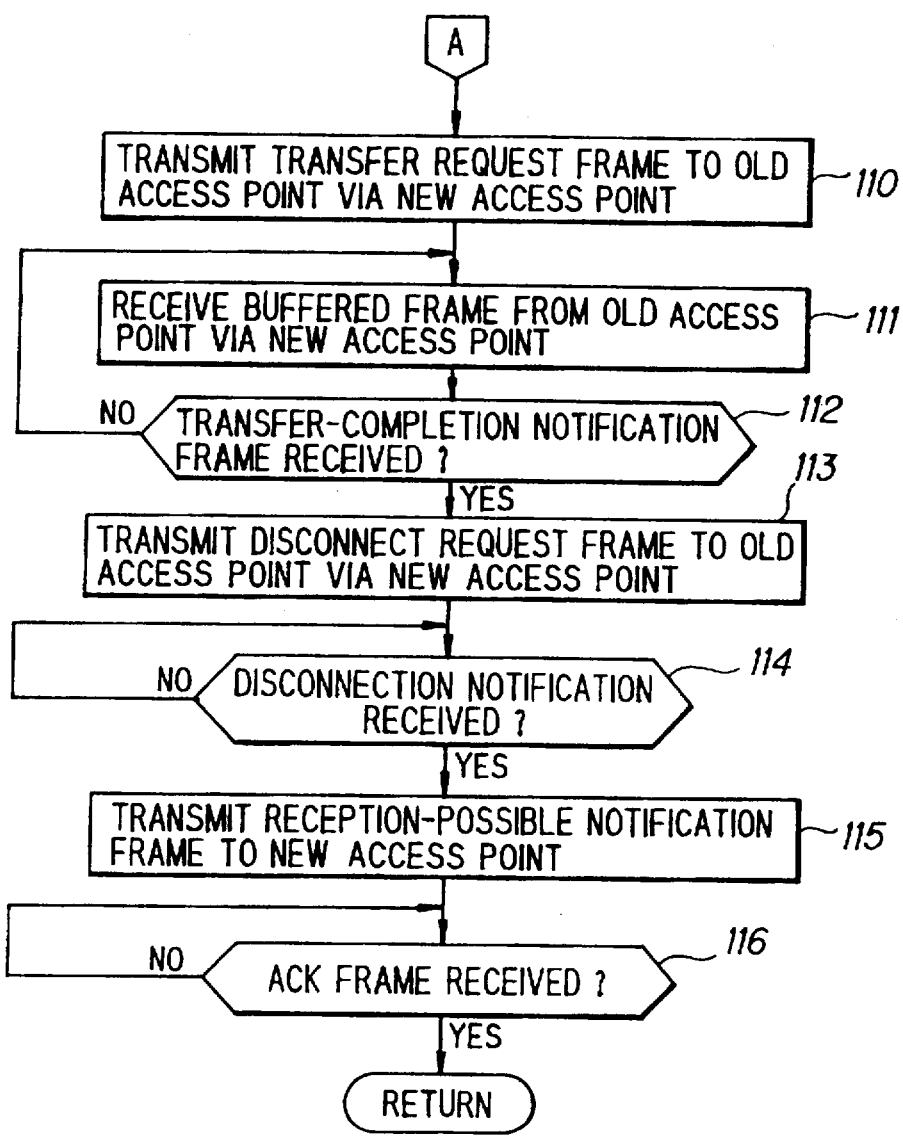
FIG. 9 is a flowchart (part 2) of the processing executed by the user station.

FIGS. 8 and 9 are flowcharts of processing executed by the user station.

Control of Search for Connectable Access Points

When a time arrives for updating the master-station management table 25 (step 101), the table updating timer 27 outputs a trigger signal for starting a search. In response to the trigger signal, the processor 24d executes processing for finding a connectable access point. More specifically, the processor 24d (1) activates the table processor 26, (2) receives a control frame sent from each access point and (3) and notifies the table processor 26 of the addresses of the access points that transmitted the control frames. In concurrence with the foregoing, the table processor 26 accepts the frame reception strength from the electric field strength detector 23 (step 102). If the frame reception strength is above the set level, the table processor 26 registers the access point address, the ranking and the status (connection not tried) in the master-station management table 25. If the frame reception strength is below the set level, the table processor 26 discards the frame (step 103). Methods of search include a method of receiving the control frame which the access point broadcasts periodically within its own cell, and a method in which the user station issues a request and a receives control frame which the access point transmits in response to the request.

Thenceforth, and in similar fashion, control frames transmitted by each of the access points are successively received and the addresses of connectable access points, data indicating the quality of the communication environments thereof and the status (connection not tried) of each connectable access point are stored in the master-station management table 25. When this has been accomplished, control for the search of connectable access points ends. Thereafter, the above-described search control is performed periodically whenever the timer 27 issues the trigger signal for starting the search. As a result, the master-station management table 25 retains connectable access points for the latest position of the user station.

It should be noted that search control is also performed (1) not only when the timer runs out but also (2) when the LAN is accessed by a user station after introduction of power to the user station and (3) when a connection cannot be made to any access point in the master-station management table 25.

Access Point Changeover Control

The processor 24d receives the control frame sent periodically from the present access point as well as the data frame addressed to it and performs monitoring to determine whether the frame reception strength at this time is above the set level. In a case where the set level is exceeded, the processor 24d periodically executes search processing from step 101 onward. On the other hand, when the frame reception strength falls below the set level owing to movement of the user station 14, i.e., when movement between cells is sensed (step 104), the processor 24d refers to the master-station management table 25 and sends a connection request frame to the access point having the best communication environment (the access point having the highest ranking) (step 105). Since a access point ordinarily responds to a connection request frame by transmitting an ACK frame, monitoring is subsequently performed to determine whether the ACK frame has been received within a prescribed period of time (step 106). If the ACK frame has been received, master-station changeover control from step 110 onward is executed to establish a connection to the access point. By adopting this arrangement, the user station need not search for the connectable access point when a changeover is made between access points and is capable of establishing a connection to the access point having the best communication environment in a short period of time.

When the position of the user station undergoes a considerable change after the latest search but before the next search is performed, there are cases where a connection cannot be established with the access point having the highest rank. In such case the ACK frame will not be received within prescribed period of time. Accordingly, the status of the above-mentioned access point in the master-station management table 25 is made "connection not allowed" and it is determined whether a access point having the next highest rank exists (step 107). If it does exist, the program returns to step 105, where the connection request frame is sent to the access point and the status of this access point is made "connection request in progress". In a connection is made, the status is made "connection in progress".

In a case where a connection cannot be established with any of the access points stored in the master-station management table 25 owing to sudden movement of the user station, a "YES" decision is rendered at step 107. In such case search control is performed immediately (step 108) and the program then returns to step 105, at which a connection request is made in the order of priority and a connection is made to the access point having the best state of communication.

When the connection to the new access point $12_2$ is established, namely when the ACK frame is received from the new access point $12_2$, the processor 24d of the user station 14 sends a transfer request frame to the old access point $12_1$, via the new access point $12_2$, so that the data addressed to the mobile user station 14 and stored in the data buffer of the old access point will be transferred to the mobile user station 14 (step 110). In response to the transfer request, the old access point $12_1$ transfers the data addressed to the mobile user station 14 stored in the buffer to the mobile user station 14 in one batch or in frame units and the user station 14 receives the data via the new access point $12_2$ (step 111).

After transferring all of the stored data, the old access point $12_1$ sends the mobile user station a frame notifying of completion of transfer. The mobile user station 14 therefore monitors reception of the transfer-completion notification frame (step 112) and, if the frame is received via the new access point $12_2$, sends a disconnection request frame to the old access point $12_1$ via the new access point $12_2$ (step 113) and waits for reception of a frame notifying of disconnection (step 114).

In response to the disconnection request from the mobile user station 14, the old access point $12_1$ deletes the address of the mobile user station from the slave-station management table 34, cuts the communication path to the mobile user station 14 and notifies the latter of this fact via the new access point $12_2$ by means of a disconnection frame. Upon receiving the disconnection notification frame from the old access point $12_1$, the mobile user station 14 sends the new access point $12_2$ a frame notifying of the fact that reception is possible (step 115). Upon receiving this frame, the new access point $12_2$ subsequently executes control in such a manner that all frames addressed to the mobile user station 14 are relayed to the mobile user station 14 and sends the ACK frame to the mobile user station 14. Upon receiving the ACK frame (step 116), the user station 14 ends master-station changeover control.

(c) Access Point (c-1) Construction

Figure 10:
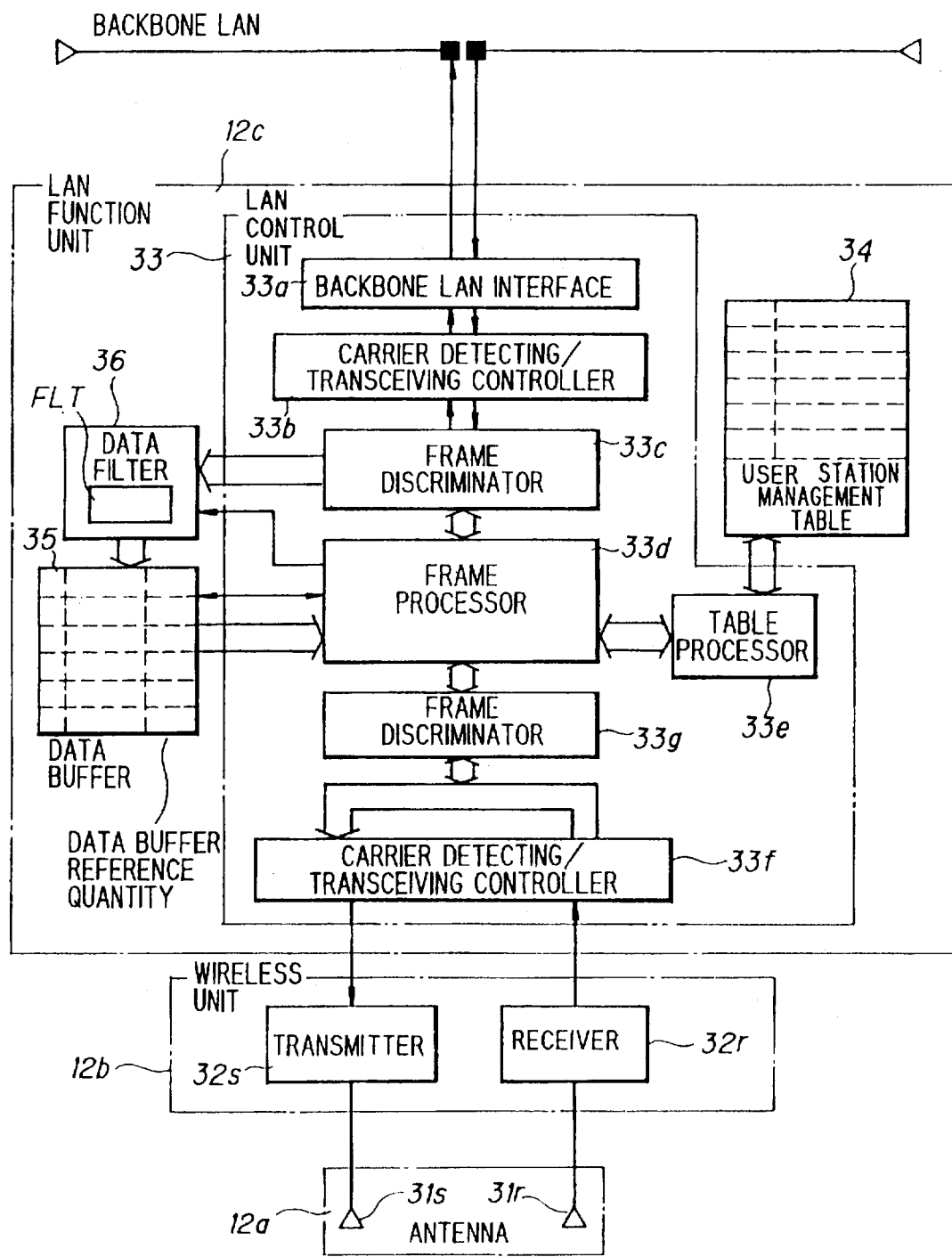
FIG. 10 is a block diagram showing the construction of a access point.

FIG. 10 is a block diagram illustrating the access point. The access point includes an antenna 12a, a wireless section 12b and a LAN function unit 12c. A transmitting antenna 31s and a receiving antenna 31r are provided as the antenna 12a, though an arrangement may be adopted in which these antennae are shared. The wireless section 12b includes a transmitter 32s and a receiver 32r.

The LAN function unit 12c includes a LAN controller 33, the slave-station management table 34 for storing the addresses of user stations under its supervision, a data buffer 35 for temporarily storing data addressed to the user stations, and a data filter 36 for accepting the data addressed to the user stations under control and storing the data in the data buffer 35. The data filter 36 has a filtering table FLT.

Figures 11, 12:
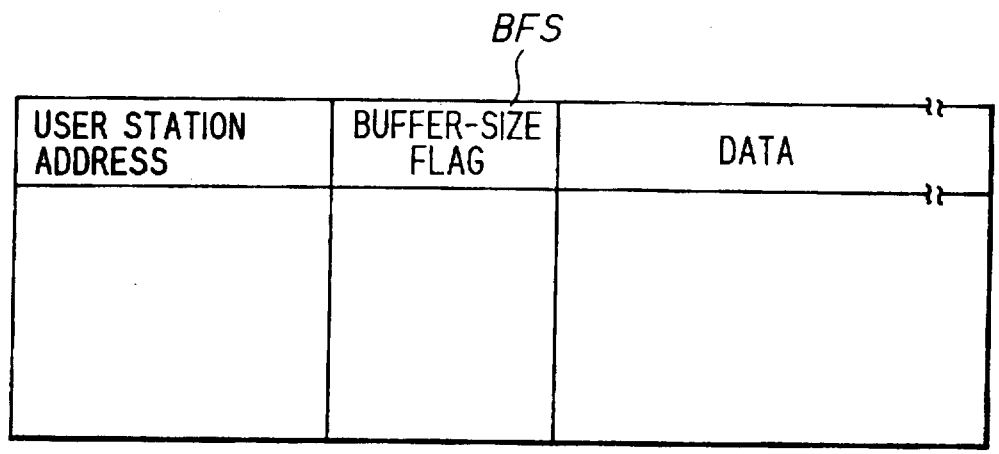
FIG. 11 is a diagram showing constitution of a data buffer.
FIG. 12 is a diagram showing the constitution of a filtering table.

As shown in FIG. 11, the data filter 35 stores data, which is addressed to the user stations under control, in correspondence with the addresses of the user stations. Stored along with the data is a buffer-size flag BFS indicating whether the data buffer capacity is greater than a set capacity. The buffer-size flag BFS is used in deciding whether a data transfer is made in one batch or in frame units when the mobile user station moves and data addressed to the mobile user station is transferred from the old access point to the new access point. More specifically, in case of a batch transfer, transfer time can be shortened but the backbone LAN is occupied and the burden imposed upon the data buffer of the access point increases. Accordingly, batch transfer is performed when the data buffer capacity is less than the set value and transfer in frame units is carried out when the data buffer capacity is greater than the set value.

As shown in FIG. 12, the filtering table FLT of the data filter 36 stores (1) addresses CAD of the user stations under supervision, (2) reception identification data RIDT indicating that data addressed to the user stations is allowed to be received, allowed in part or not allowed, and (3) a sending address SAD in a case where reception of the data is allowed in part. Ordinarily, all of the data addressed to a user station that is under supervision is stored in the data buffer 35 and, hence, "reception allowed" is stored in correspondence with the address of the user station that is under supervision.

However, when the user station 14 (FIG. 4) moves and the state of communication between it and the present access point $12_1$ deteriorates, the user station 14 establishes connection and communication with the new access point $12_2$ while maintaining the communication path to the present access point. Next, the user station 14 requests the old access point $12_1$, via the new access point $12_2$, to transfer the data addressed to the mobile user station and instructs the old access point to cut the communication path after the transfer is complete. As a consequence, when the connection between the user station 14 and new access point $12_2$ has been established, the connection between the user station 14 and the old access point $12_1$ is maintained and redundant paths come to exist between the mobile user station and the backbone LAN. Accordingly, until the communication path to the old access point is cut, "reception allowed in part" is stored as the reception identification data RIDT in the filtering table FLT in correspondence with the address CAD of the mobile user station connected to the new access point $12_2$, and the address SAD of the old access point $12_1$ is stored in correspondence with this CAD so that only the frames from the old access point $12_1$ will be relayed.

Further, after completion of the transfer of data addressed to the mobile user station stored in the buffer, the old access point $12_1$ is no longer capable of transferring data to the mobile user station in order that the user station may request the old access point for disconnection, as will be described later. Accordingly, until the communication path to the mobile user station is cut following the transfer of the stored data, it is necessary to discard the frames addressed to the mobile user station. To this end, "reception not allowed" is stored as the identification data RIDT in the filtering table FLT in correspondence with the address of the mobile user station.

The LAN controller 33 includes a backbone LAN interface 33a for interfacing the backbone LAN, a carrier detection/transception controller 33b for detecting a carrier on the backbone LAN and controlling the sending/receiving of frames with respect to the backbone LAN, a frame discriminator 33c, a frame processor 33d, a table processor 33e for executing processing to update the slave-station management table, a carrier detection/transception controller 33f for detecting a carrier on the wireless LAN and controlling the sending/receiving of frames with respect to the wireless LAN, and a frame discriminator 33g.

(c-2) Processing Executed by New Access Point

Figure 13:
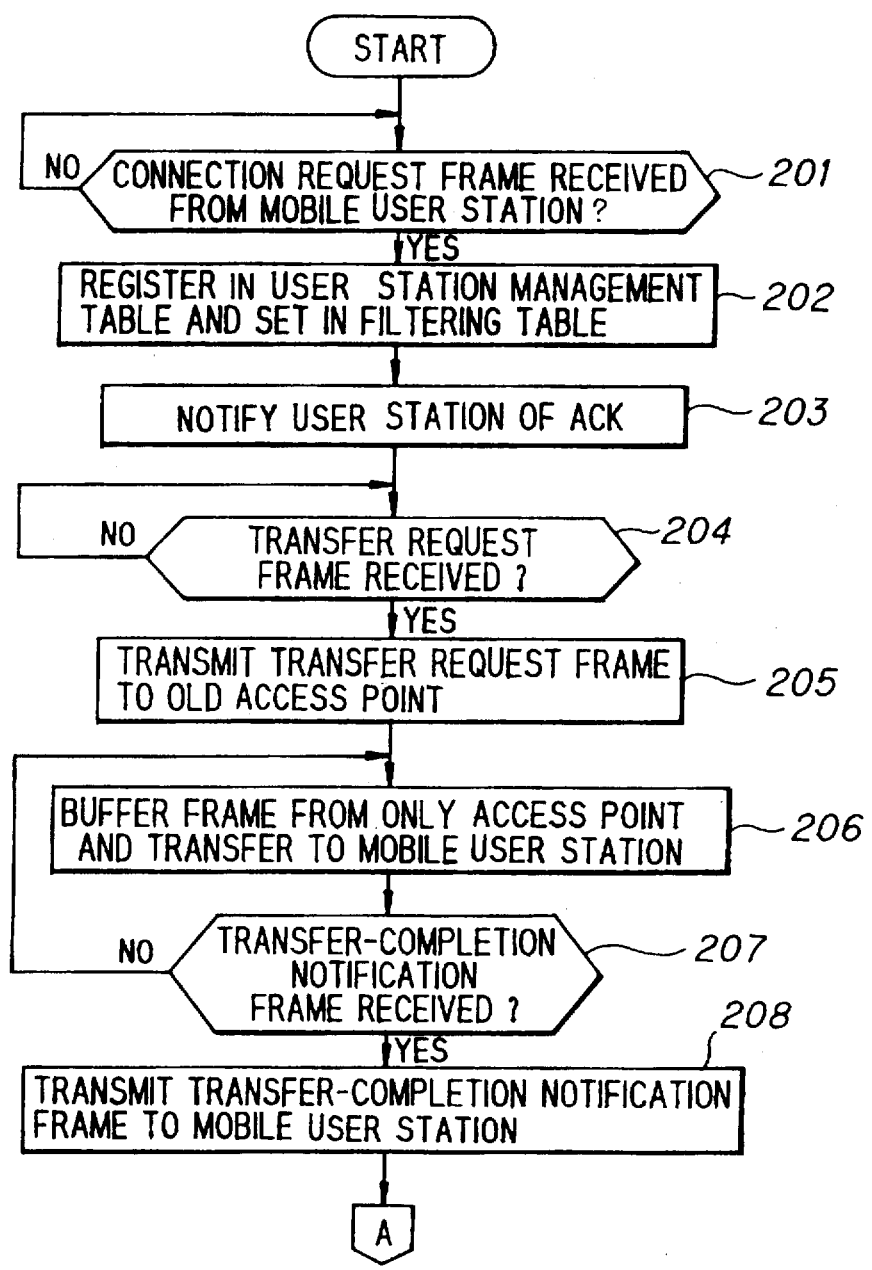
FIG. 13 is a flowchart (part 1) of the processing executed by the access point.
Figure 14:
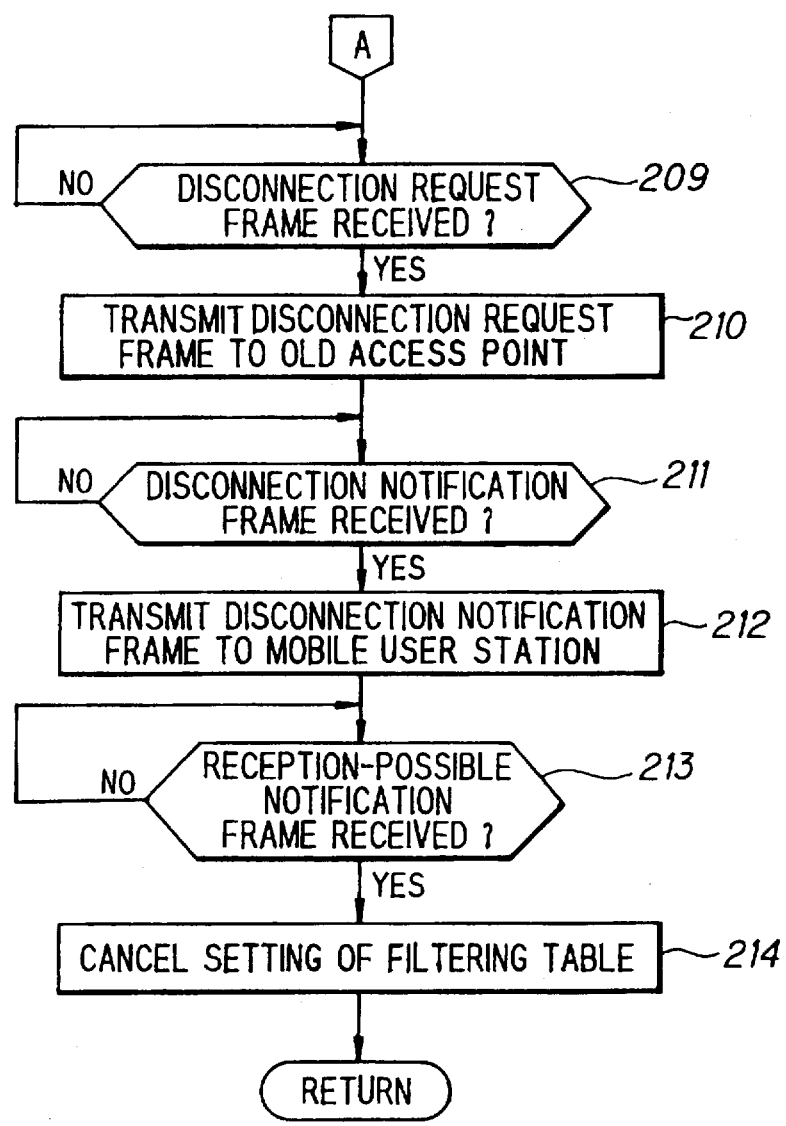
FIG. 14 is a flowchart (part 2) of the processing executed by the access point.

FIGS. 13 and 14 are flowcharts of processing executed by the access point at the time of master-station changeover.

When it becomes necessary to make a connection to a new access point, the mobile user station 14 (FIG. 4) sends the connection request frame to the new access point $12_2$ while maintaining the communication path between the mobile user station and the prevailing access point (old access point) $12_1$. Upon receiving the connection request frame from the mobile user station 14 (step 201), the frame processor 33d of the new access point $12_2$ delivers to the table processor 33e the address of the mobile user station 14, which is the source of the connection request frame. As a result, the table processor 33e writes the address of this mobile user station in the slave-station management table 34. Further, of the frames addressed to the mobile user station, the table processor 33d relays to the mobile user station 14 only those frames from the old access point $12_1$; it discards the other frames addressed to the mobile user station. In order to accomplish this, the table processor 33 stores the address of the mobile user station 14, "reception allowed in part" and the address of the old access point (which address is contained in the connection request frame) in the filtering table FLT of the data filter 36 (step 202). Next, the frame processor 33d transmits the ACK frame in order to establish a connection with the user station 14 (step 203).

If the transfer request frame addressed to the old access point is subsequently received from the user station 14 (step 204), the transfer request frame is sent to the backbone LAN $10_2$ (step 205). The network relay 15 accepts the transfer request frame, refers to the bridge path table BPT and relays the above-mentioned frame to the backbone LAN $10_1$ to which the old access point $12_1$, which is the destination, belongs. Further, the network relay 15 investigates the bridge path table BPT to determine whether the transmitting address (the address of the mobile user station 14) has been stored in correspondence with the backbone LAN $10_2$. In this case, the address of the mobile user station 14 has been stored in correspondence with the backbone LAN $10_1$. Therefore, the network relay 15 judges that the mobile user station 14 has moved from one cell to another and makes the address of this mobile user station correspond to the backbone LAN $10_2$ (i.e., updates the bridge path table).

Upon receiving the transfer request frame from the backbone LAN $10_1$, the old access point $12_1$ transfers the data addressed to the mobile user station, which data has been stored in the data buffer, to the backbone LAN $10_1$ with the mobile user station 14 serving as the destination. The transfer is made is one batch or in frame units. The new access point $12_2$ accepts the data frames, which are addressed to the mobile user station, from the backbone LAN $10_2$, stores the frames in the data buffer 35 and subsequently transfers the frames to the mobile user station 14 one after another (step 206).

If the old access point $12_1$ transfers all of the stored data, it transmits the frame notifying of completion of the transfer, with frame being addressed to the mobile user station. If the new access point $12_2$ receives the frame notifying of transfer completion (step 207), it immediately transmits the frame to the mobile user station 14 (step 208).

Upon receiving the frame notifying of completion of the transfer, the mobile user station 14 transmits the disconnection request frame. When the new access point $12_2$ receives this disconnection frame, therefore, it transmits the frame to the old access point $12_1$ (steps 209, 210). In response to the disconnection request from the mobile user station, the old access point $12_1$ deletes the address of the mobile user station from the slave-station management table 34, cuts the communication path to the mobile user station and transmits the disconnection notification frame to the address of the mobile user station. Upon receiving the notification of disconnection, the new access point $12_2$ immediately transmits this frame to the mobile user station 14 (steps 211, 212).

Upon receiving the disconnection notification frame from the old access point $12_1$, the new access point $12_2$ transmits the frame notifying of the fact that reception is possible. Upon receiving this frame, the new access point $12_2$ stores "reception allowed" in the filtering table FLT of data buffer 36 in correspondence with the address of the mobile user station 14 and subsequently relays to the mobile user station 14 all frames that are addressed to it (steps 213, 214). This ends control for changeover between access points.

Thus, the mobile user station establishes communicating connection to the new access point while maintaining the communication path to the old access point, after which the mobile user station requests the old access point, via the new access point, to transfer data that is addressed to the mobile user station. After completion of the transfer, the mobile user station instructs the old access point to cut the communication path. As a result of this arrangement, data addressed to the mobile user station accumulated in the buffer of the old access point is not discarded.

When the connection between the mobile user station and the new access point is established, redundant paths come into existence. However, of the frames addressed to the mobile user station, the new access point $12_2$ relays to the mobile user station 14 only the frames from the old access point $12_1$ and discards the other frames addressed to the mobile user station 14. This makes it possible to prevent erroneous operation due to the existence of redundant paths.

On the basis of the address of the source transmitting the data transfer request frame, the network relay 15 changes the content of the internal bridge path table BPT. Therefore, even if the user station moves between cells, the network relay 15 is capable of correctly sending frames, which are addressed to the mobile user station, to the backbone LAN to which this user station belongs, and the mobile user station is capable reliably receiving the frames addressed to it.

Figure 15:
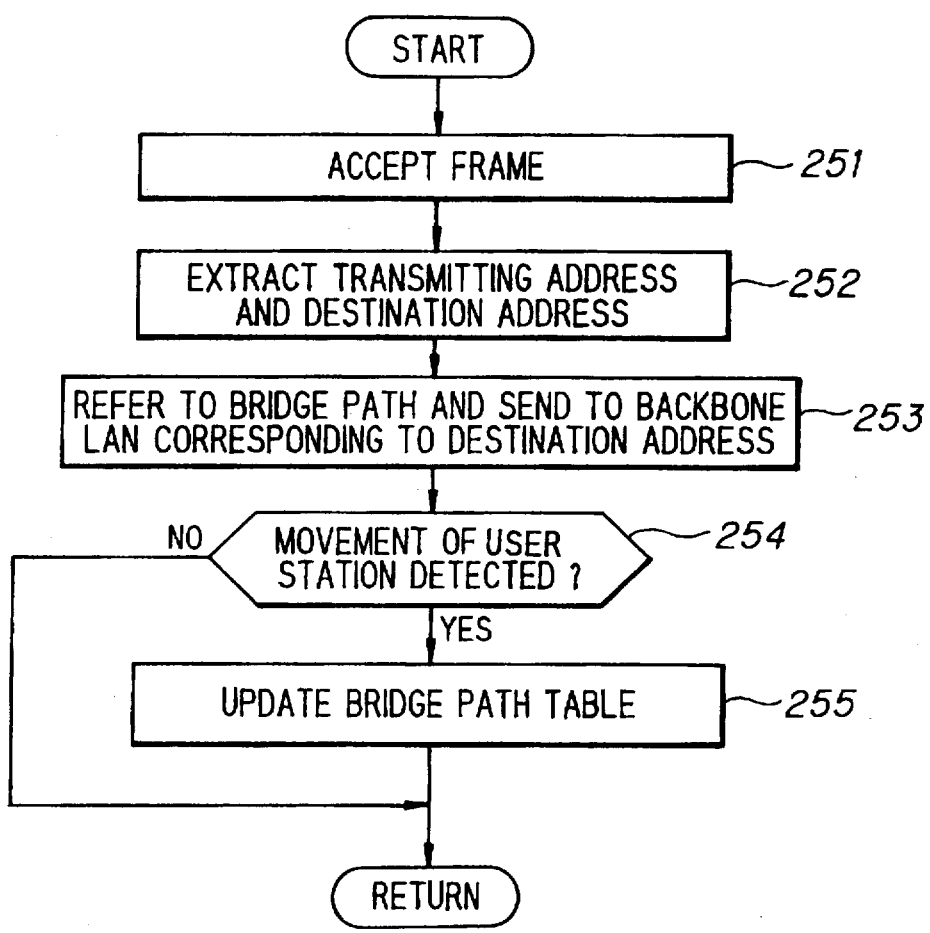
FIG. 15 is a flowchart of processing for managing the bridge path table.

FIG. 15 is a flowchart of processing executed by the network relay 15.

The network relay 15 accepts a frame from the backbone LAN (step 251) and extracts the transmitting address and the destination address from the frame (step 252). Next, the network relay 15 refers to the bridge path table BPT, obtains the backbone LAN to which the destination address belongs and sends the accepted frame to this backbone LAN (step 253). The network relay 15 then investigates the bridge path table BPT to determine whether the transmitting address (the address of the mobile user station 14) has been stored in correspondence with the backbone LAN that has accepted the frame. In other words, the relay 15 determines whether the mobile user station has moved between cells (step 254).

If movement between cells has not occurred, processing is terminated. If the mobile user station has moved between cells, however, the network relay 15 updates the bridge path table BPT in such a manner that the transmitting address is made to correspond to the backbone LAN that accepted the frame (step 255). Processing is then terminated.

(c-3) Processing Executed by Old Access Point

Figure 16:
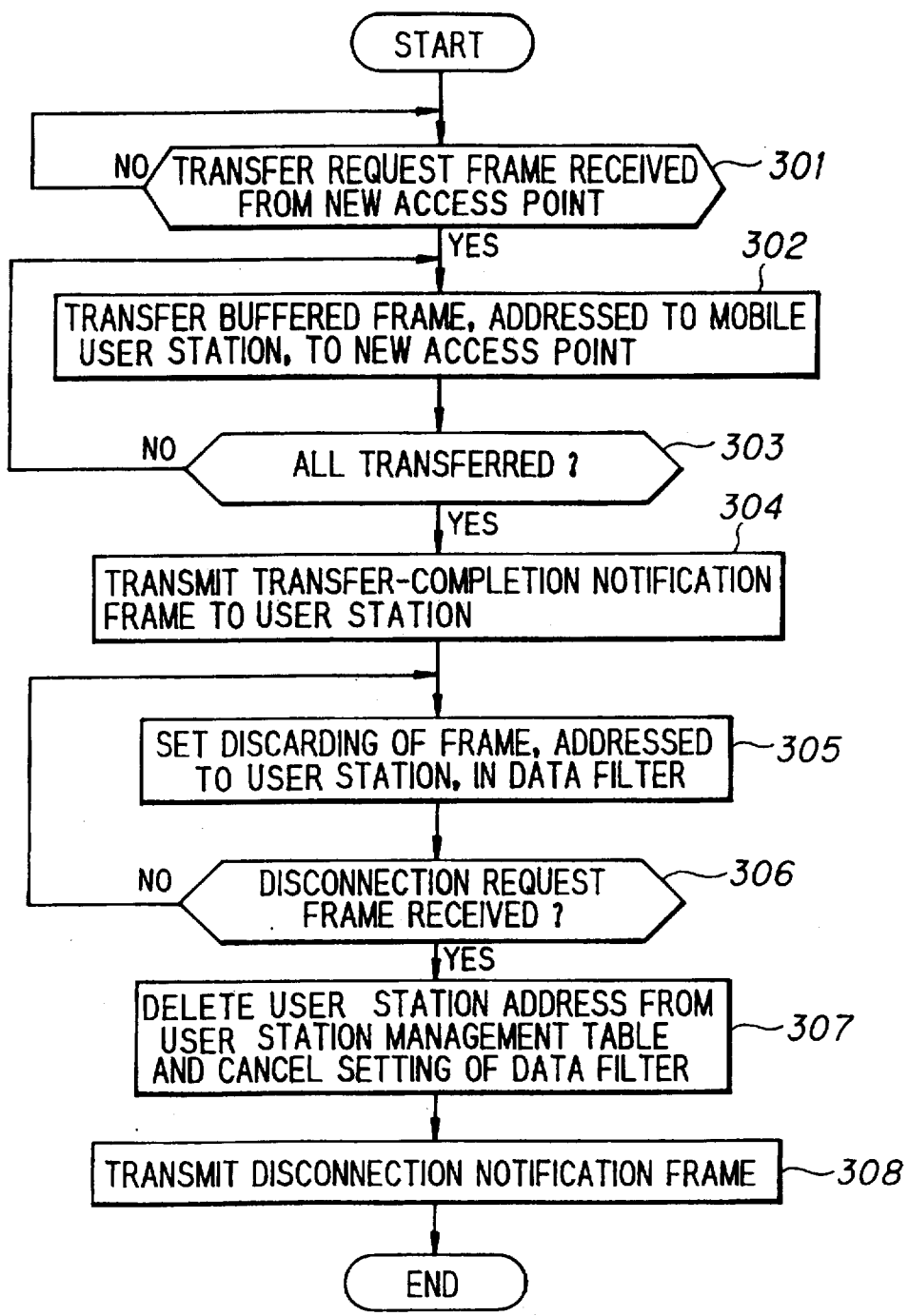
FIG. 16 is a flowchart of processing executed by an old access point.

FIG. 16 is a flowchart of the processing executed by the old access point.

Upon receiving, from the backbone LAN $10_1$, the transfer request frame from the mobile user station 14 via the new access point $12_1$ (step 301), the frame processor $33d$ of the old access point $12_1$ transfers the data addressed to the mobile user station 14 stored in the data buffer 35 to the backbone LAN $10_1$ in one batch or in frame units, with the mobile user station 14 being the destination of the data (steps 302, 303). If the transfer of all stored data is completed, or in a case where there is no data to be transferred, the frame processor $33d$ of the old access point $12_1$ immediately transmits the transfer completion notification frame, which is addressed to the mobile user station (step 304). Thereafter, even if a frame addressed to the mobile user station 14 is accepted, the frame processor sets "reception not allowed" in the filtering table FLT of the data filter 36 so that the frame will be discarded (step 305).

Upon receiving the transfer completion notification frame, the mobile user station 14 sends the disconnection request frame to the old access point $12_1$. Upon receiving the disconnection request frame, the frame processor $33d$ of the old access point $12_1$ deletes the address of the mobile user station 14 from the slave-station management table 34, cuts the communication path to the mobile user station 14 and clears the set data of the mobile user station 14 from the filtering table FLT (steps 306, 307). Next, the frame processor $33d$ sends the disconnection notification frame to the address of the mobile user station (step 308) and terminates control for master-station changeover.

When the transfer request frame has been received, the old access point may transfer the stored data in one batch or may transfer the stored data in frame units, as in ordinary frame transmission. In the case of batch transfer, a frame of maximum length (1518 bytes for the Ethernet) in line with the specifications of a backbone LAN is formed and the transfer is made in order starting from the data at the beginning of the buffer.

In the case of batch transfer, transfer time can be shortened. When the amount of data transferred is large, however, the backbone LAN is occupied for a long period of time and a larger burden is placed upon the data buffer of the new access point. In the case where transfer is performed frame by frame, the backbone LAN is not occupied and the burden upon the data buffer of the new access point is alleviated, though transfer takes longer.

By way of example, in a system in which the user station operates in a power conserving mode and is activated (enabled for reception) intermittently, the new access point $12_2$ is capable only of intermittent transmission of the data, addressed to the user station, stored in its buffer. Consequently, if the buffer capacity of the old access point $12_1$ for the data addressed to the mobile user station is large, the buffer 35 of the new access point $12_2$ will not develop enough vacancy when the data is transferred in one batch. In addition, the new access point $12_2$ immediately starts buffering and transfer of all frames addressed to the mobile user station and stores the frames in the buffer one after another, as a result of which the buffer of the new access point is subjected to an excessive load. Accordingly, changeover control is performed in such manner that data is transferred in one batch or in frame units depending upon the amount of data transferred from the old access point $12_1$.

Figure 17:
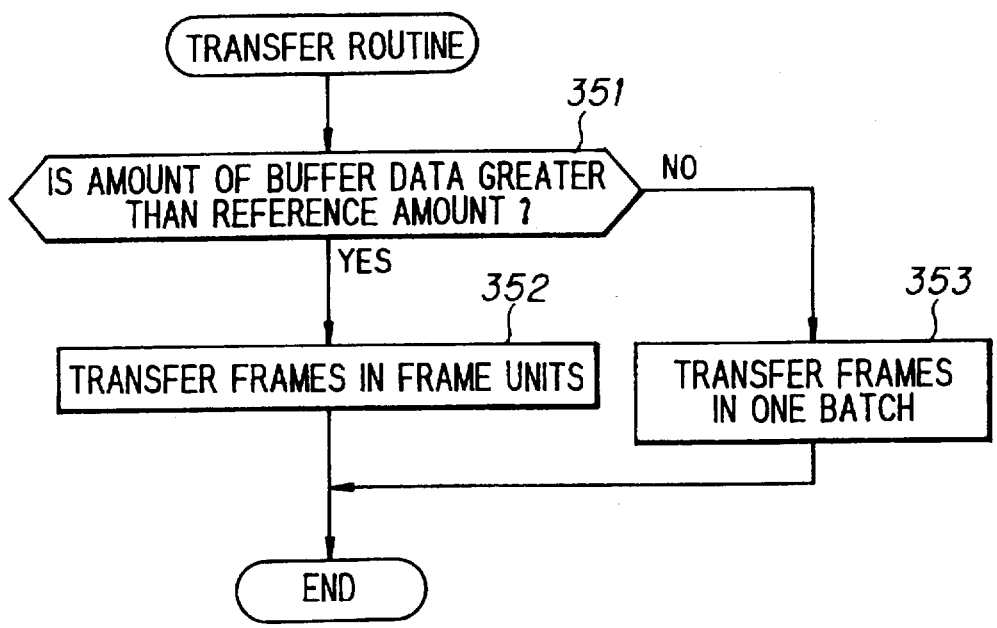
FIG. 17 is a flowchart of processing of a transfer routine.

FIG. 17 is a flowchart of processing for such control of transfer. Reference is had to the buffer-size flag BFS to determine whether the amount of data transferred is greater than a stipulated amount (step 351). Transfer is performed in frame units (step 352) if the stipulated amount is exceeded and in one batch (step 353) if the stipulated amount is not exceeded. If control is executed in this fashion, the data can be transferred without subjecting the data buffer of the new access point $12_2$ to a large load.

(d) Frame Sending/Receiving Procedures Executed by Various Units

Figure 18C:
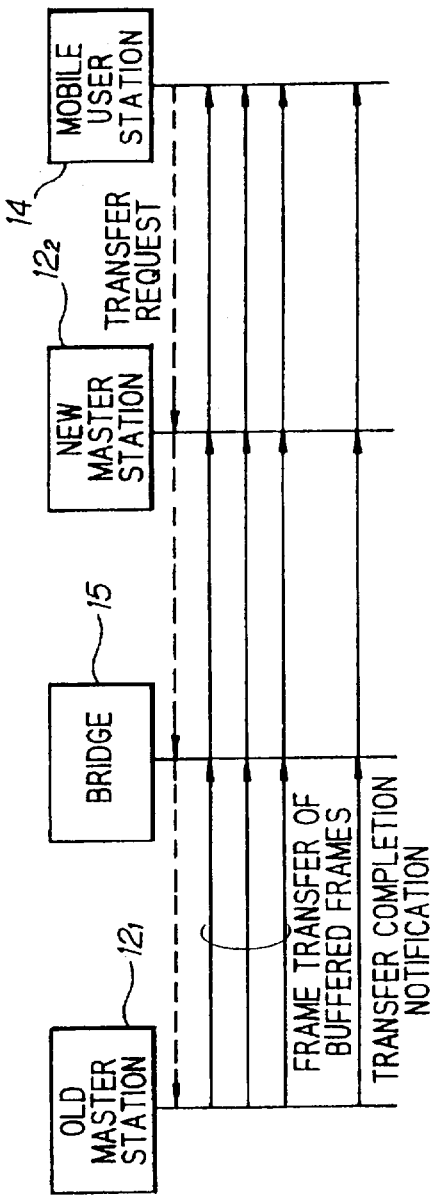
Figure 18D:
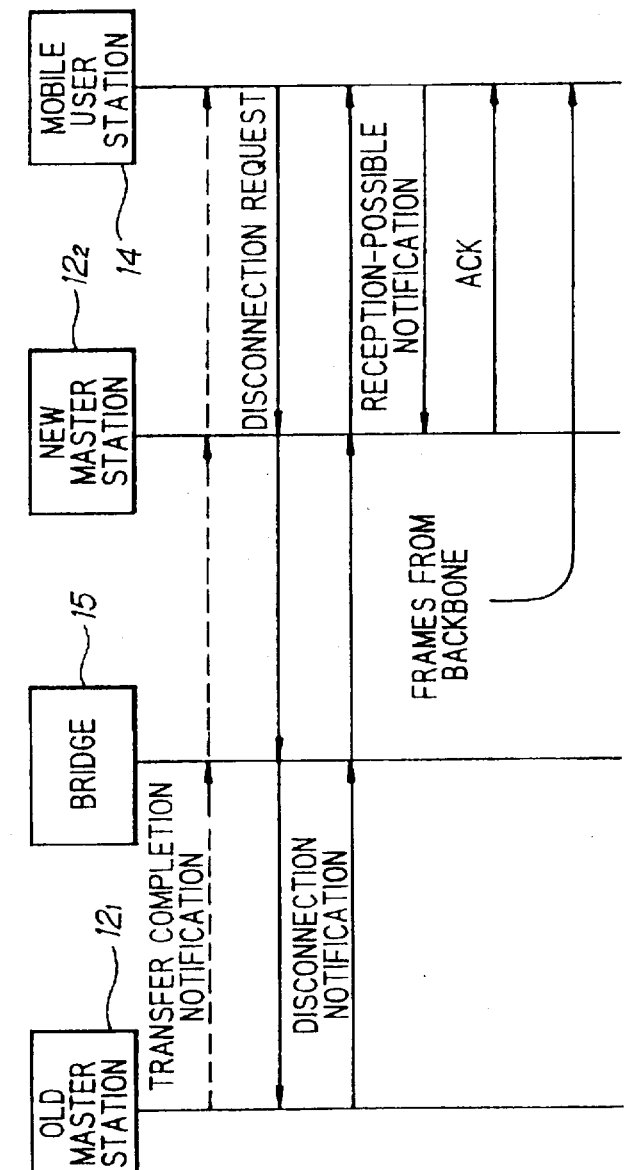

FIGS. 18A–18D are diagrams useful in describing procedures for sending and receiving frames and data among the mobile user station, new access point, bridge (network relay) and old access point. Specifically, FIG. 18A shows a procedure up to transmission of the data transfer request frame from the mobile user station, FIG. 18B a procedure for batch transfer of stored data in response to the transfer request, FIG. 18C a procedure for frame-unit transfer of the stored data and FIG. 18D a procedure executed after transmission of the disconnection request frame.

(e) Different Form of Changeover Control

In the foregoing, access points are switched between by the sending and receiving of the transfer request frame, transfer completion notification frame, disconnection request frame and disconnection notification frame between the mobile user station 14 and old access point $12_1$ after the connection to the new access point $12_2$ is established. Since the frames sent and received are numerous, however, the changeover takes time. Accordingly, an arrangement can be adopted in which a movement notification frame is sent from the mobile user station 14 to the old access point $12_1$ after the connection to the new access point is established, and the old access point $12_1$ responds to reception of this frame by transferring the stored data, notifying of completion of transfer and cutting the communication path to the mobile user station, thereby shortening the time needed for the changeover between access points.

Figure 19A:
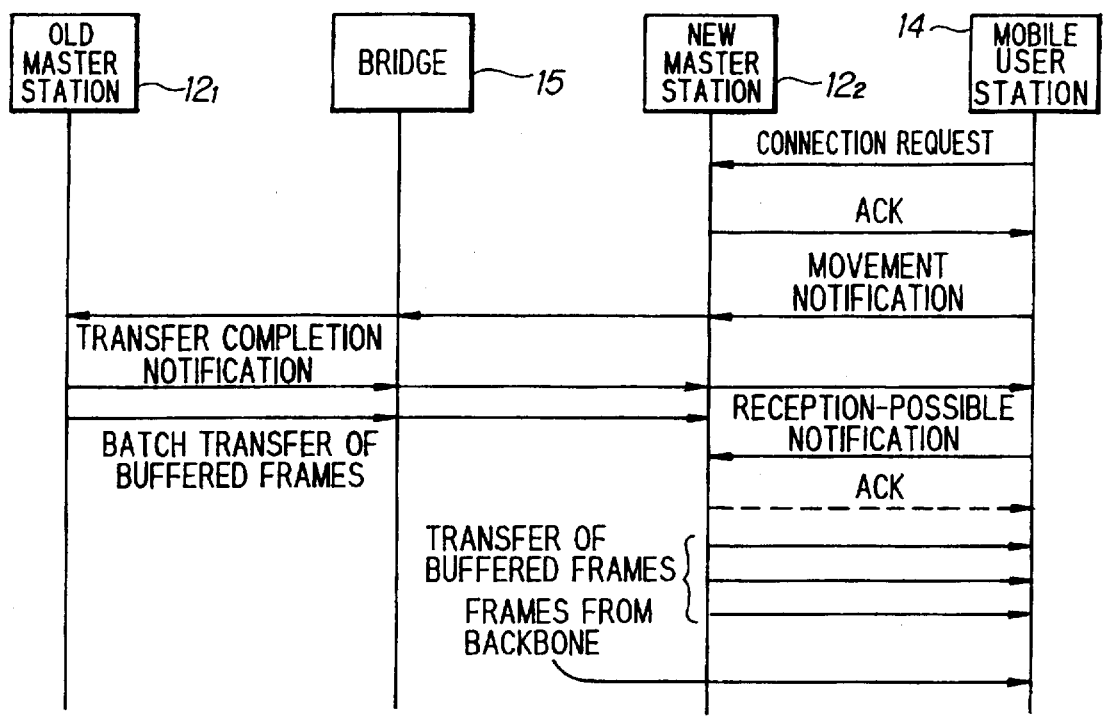
FIGS. 19A, 19B are diagrams for describing another changeover control procedure.

FIG. 19A is a diagram for describing such changeover control.

After connection to the new access point $12_2$ is established, the mobile user station 14 sends the old access point $12_1$, via the new access point $12_2$, a movement notification frame requesting (1) that the data addressed to the mobile user station stored in the buffer of the old access point be transferred and (2) that the address of the mobile user station be deleted from the slave-station management table 34.

In response to reception of the movement notification frame, the old access point $12_1$ adds the transfer notification frame onto the beginning of the stored data addressed to the mobile user station and then transfers the data in one batch or in frame units, wherein the frame gives notification of (1) the fact that the data transfer has been performed, and (2) the fact that the address has been deleted and the communication path to the mobile user station cut. As to whether the transfer is performed in one batch or in frame units, the amount of data addressed to the mobile user station stored in the buffer is monitored, batch transfer is performed if the amount of data is less than the set value and frame-unit transfer is performed if the amount of data is greater than the set value. This is as set forth above earlier.

If the arrangement described above is adopted, the mobile user station 14 need transfer only one type of movement notification frame after the connection to the new access point $12_2$ is established. This makes it possible to shorten the time needed to change over between access points. Further, since the notification of completion of transfer can be received before the accumulated data addressed to the mobile user station is transferred, notification of the fact that reception is possible can be sent to the new access point $12_2$ immediately so that all frames addressed to the mobile user station can be relayed.

Figure 19B:
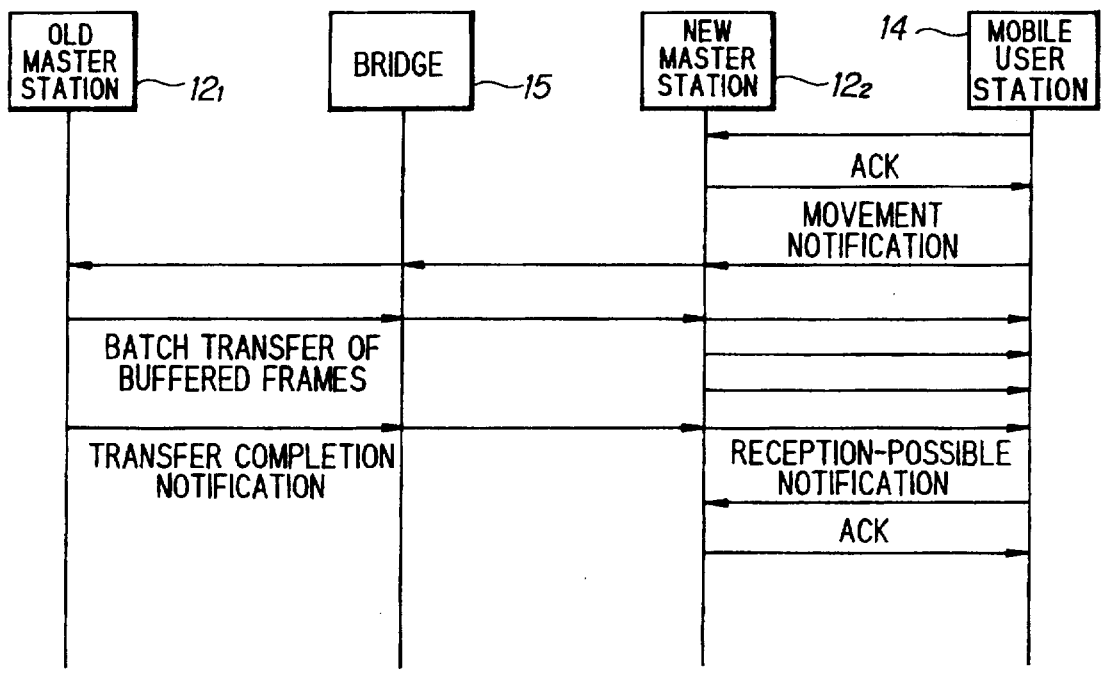

It should be noted that an arrangement may be adopted in which the frame giving notification of completion of transfer is transmitted to the mobile user station after the data transfer, as shown in FIG. 19B.

The foregoing is a case in which the communication path to the old access point is cut after the data stored in the buffer is transferred. However, in a situation where it is desired to establish the connection between the mobile user station and the new access point quickly, the wireless LAN system can be constructed in such a manner that the mobile user station transmits only the disconnection request frame to the old access point immediately, without requesting a transfer of data, after the request for connection to the access point is made, and the old access point responds to the disconnection request by deleting the address of the mobile user station from the slave-station management table, cuts off communication and discards the stored data addressed to the mobile user station without transferring this data. In this case also the mobile user station requests cut-off and therefore the updating of the bridging path in the network relay can be carried out.

(E) Second Embodiment of the Invention (a) Wireless LAN Ssystem

FIG. 20 is a diagram showing the configuration of a wireless LAN system according to a second embodiment of the invention. The wireless LAN system includes the backbone LAN 50 having the basic cable 51 to which the access point 52 possessing a wireless sending/receiving function is connected. Numeral 53 denotes the segment managed by the access point 52, 54 the user station, which is connected to a terminal, for wirelessly sending signals to and receiving signals from the access point 52. Numeral 56 denotes the terminal to which the mobile user station is connected. Numeral 57 designates a server connected to the backbone LAN 50, 58 a frame transmitted from the access point and 59 a frame transmitted from the mobile user station. The access point 52 includes the non-accessing terminal retrieval unit 61 for controlling retrieval of non-accessing terminals and having the slave-station absence/presence management table 62 for managing absence/presence of user stations that are under the supervision of the access point, the non-accessing terminal address table 63 for registering non-accessing terminals, and the master address table 64 in which the addresses of all terminals, which are the object of retrieval, in the non-accessing state are registered beforehand. The user station 54 has the non-accessing terminal notification unit 81 for controlling notification of a non-accessing terminal.

The non-accessing terminal retrieval unit 61 of the access point 52 periodically sends the user station 54 under control a request frame which includes a destination address as a terminal address registered in the master address table 64. The non-accessing terminal notification unit 81 of the user station 54 sends the access point a response frame when the destination terminal contained in the request frame is being supplied with power from a power supply but is not accessing the LAN (i.e., when the destination terminal is in the non-accessing state). Upon receiving the response frame, the non-accessing terminal retrieval unit 61 of the access point 52 registers the address of the destination terminal in the non-accessing terminal address table 63. As a result, the access point is capable of grasping all terminals that are in the non-accessing state within a segment. If there is an inquiry from the server 57, the access point is capable of immediately communicating a list of the non-accessing terminals to the server.

(b) Non-Accessing Terminal Retrieval Unit in Access Point

Figure 21:
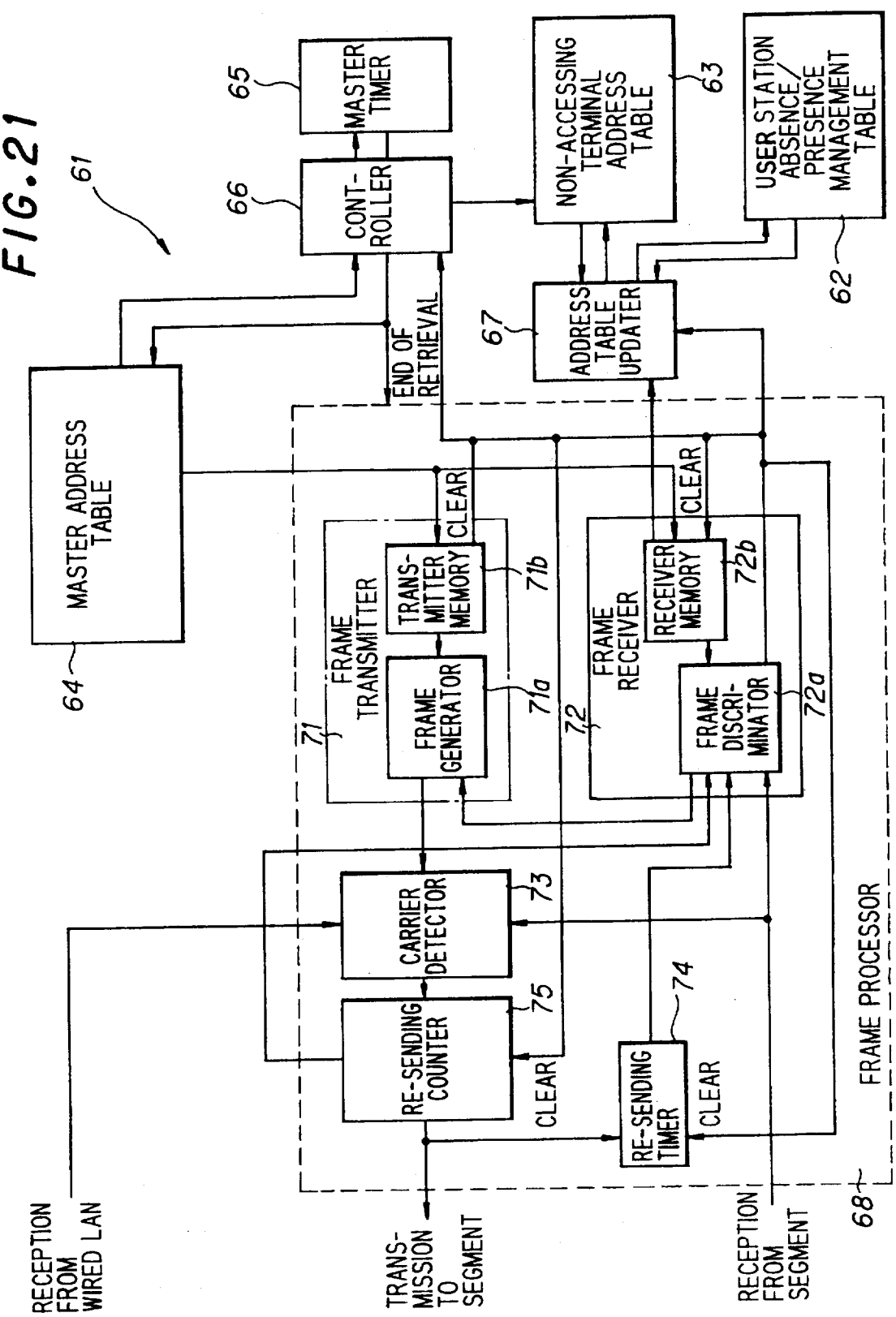
FIG. 21 is a block diagram illustrating a non-accessing terminal retrieval unit in the access point.

FIG. 21 is a block diagram showing the construction of the non-accessing terminal retrieval unit 61. As shown in FIG. 21, the non-accessing terminal retrieval unit 61 includes the slave-station absence/presence management table 62 for managing the absence/presence of user stations under supervision, the master address table 64 in which the addresses of all terminals, which are the object of retrieval, in the non-accessing state are registered beforehand, and the non-accessing terminal address table 63 for storing the addresses of non-accessing terminals within a segment. A frame processor 68 executes frame generation processing, sending/receiving processing and processing for retrieval of non-accessing terminals. A master timer 65, which is capable of being set by the user, informs of the start of updating of the non-accessing terminal address table 63 a fixed time intervals or when a set time arrives. A controller 66 is placed in a retrieval mode when updating time arrives, in which mode the controller 66 causes the frame processor 68 to execute processing for retrieving non-accessing terminals. An address table updater 67 updates (writes or deletes addresses) the non-accessing terminal address table 63 in accordance with a command from the frame processor 68.

The frame processor 68 includes a frame transmitter 71 having a frame generator 71a for generating and transmitting a request frame and an ACK frame, etc., which are necessary for control of retrieval of non-accessing terminals, and a transmitter memory 71b for storing, as a destination address, a terminal address read out of the master address table 64. The frame generator 71a generates and transmits a frame (the request frame, ACK frame, etc.) using a terminal address stored in the transmitter memory 71b as a destination address.

The frame processor 68 further includes a frame receiver 72 having a frame discriminator 72a for receiving frames (response frame, delete frame) sent from a user station and discriminating whether the frame is a correct response frame or correct delete frame, and a receiver memory 72b for storing a terminal address (a terminal which is the destination of the frame) read out of the master address table 64. The frame discriminator 72a compares the address that transmitted the received response frame and the address stored in the receiver memory 72b and decides that the frame is the correct response frame if the two addresses agree.

The frame processor 68 further includes a carrier detector for detecting a carrier from the backbone LAN or segment, and a re-sending timer 74 for deciding a request-frame re-send interval. After the frame transmitter 71 transmits the request frame, the request frame is re-sent if the response frame is not received upon elapse of a set time. The frame processor 68 further includes a re-send counter 75 which decides the number of times the request frame is re-sent. If the frame transmitter does not receive the response frame, the request frame is re-sent until the count of the aforementioned number of times is exceeded. The re-send interval is made a time interval sufficiently longer than the time required for the series of processing operations in which the access point transmits the request frame, the user station receives this request frame, executes internal processing and transmits the response frame and the access point determines whether the received frame is the response frame.

(c) Non-Accessing Terminal Notification Unit in User Station

Figure 22:
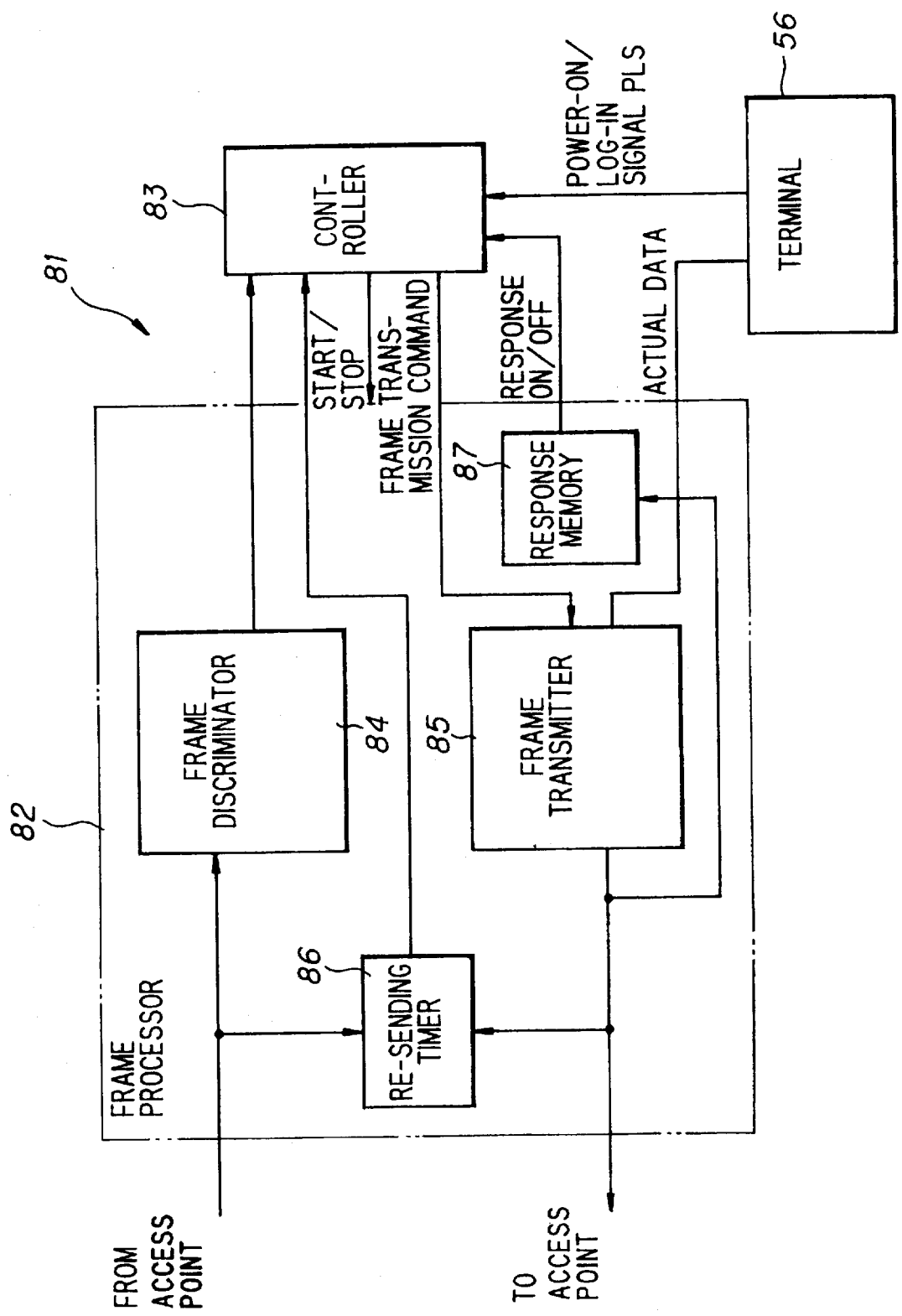
FIG. 22 is a block diagram illustrating a non-accessing terminal notification unit in the user station.

FIG. 22 is a block diagram showing the construction of the non-accessing terminal notification unit in the user station.

Numeral 82 denotes a frame processor for executing frame reception/discrimination processing, processing for generating and transmitting frames, etc. Numeral 83 denotes a controller for (1) for activating the frame processor 82 to start a non-accessing terminal notification function when the power supply of the terminal 56 connected to the user station is turned on, (2) deactivating the frame processor 82 to halt the non-accessing terminal notification function when the terminal 56 accesses the LAN, and (3) instructing the frame processor 82 to generate and transmit various frames.

The frame processor 82 includes a frame discriminator 84 for determining, and so notifying the controller, whether a received frame is a request frame or delete ACK frame addressed to its own station, and a frame transmitter 85 for (1) generating and transmitting a response frame in accordance with a command from the controller 83, and (2) generating and transmitting the delete frame in accordance with a command from the controller 83 when the terminal 56 accesses the LAN (i.e., when a log-in signal PLS is generated). The frame processor 82 further includes a re-sending timer 86 for deciding a frame re-send interval. After the frame transmitter 85 transmits the delete frame, the delete frame is re-sent if the delete ACK frame is not received upon elapse of a set time. The frame processor 82 further includes a response memory for accepting non-accepting terminal retrieval (for receiving a request frame) from the access point and storing the fact that the response frame has been transmitted.

(d) Processing for Updating Non-Accessing Terminal Table by Access Point

Figure 23:
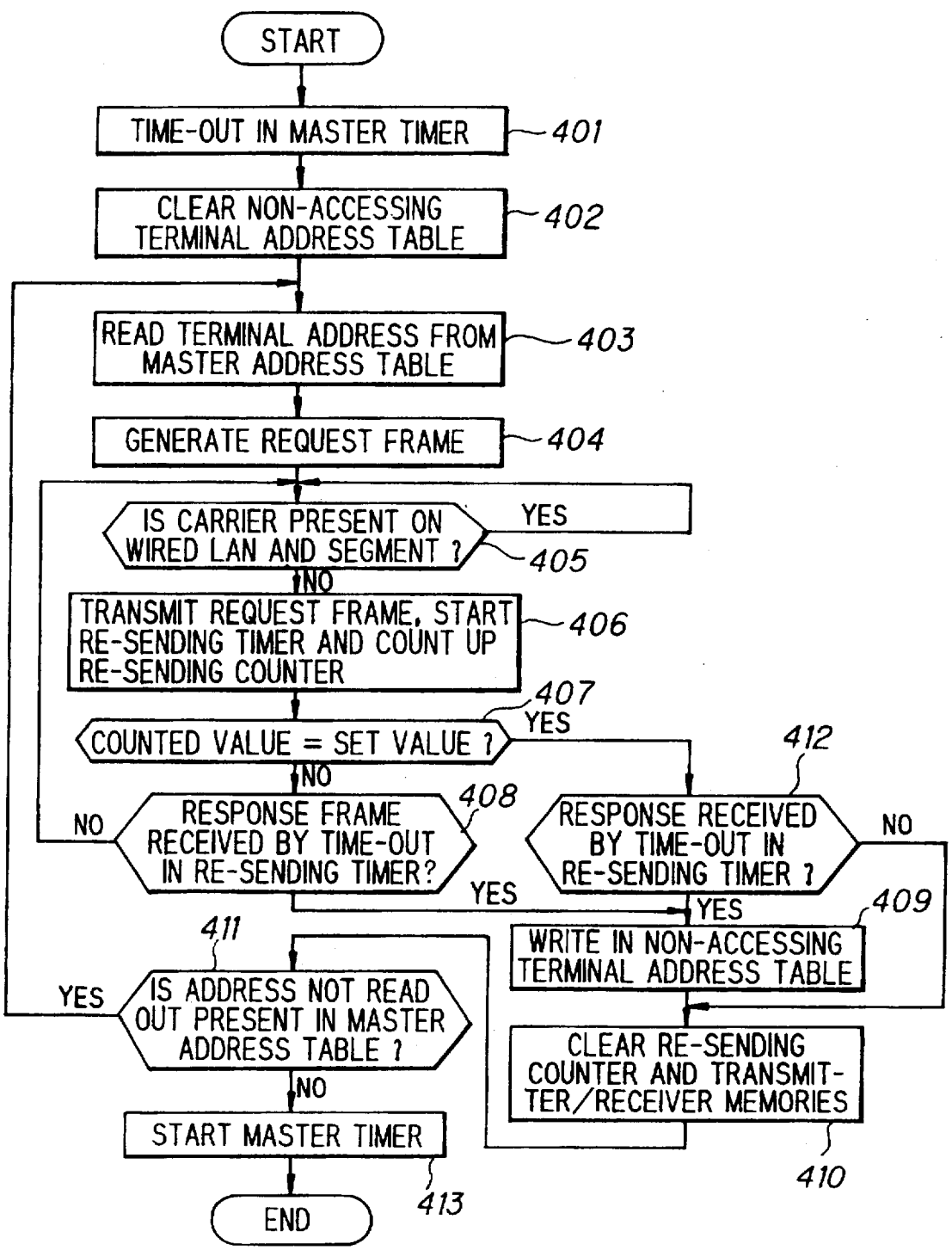
FIG. 23 is a flowchart of processing for updating a non-accessing terminal address table by the access point.

FIG. 23 is a flowchart of processing for updating a non-accessing terminal address table by the access point.

When the master timer 65 runs out of time (step 401), first the controller 66 is actuated to clear the contents of the non-accessing terminal address table 63 (step 402). Next, the controller 66 reads out the first terminal address stored in the master address table 64 and writes this terminal address in the transmitter memory 71b and receiver memory 72b (step 403). The frame generator 71a thenceforth generates a request frame onto which the terminal address stored in the transmitter memory 71b, a network address and an address request-frame flag have been added (step 404).

After the request frame is generated, the carrier detector 73 determines whether a carrier has been detected from the segment or the backbone LAN and notifies the frame transmitter 71 of the result of detection. The frame transmitter 71 stops the transmission of the request frame during carrier detection in order to prevent frame collision on the transmission line (step 405). If the carrier is not detected, then the frame transmitter 71 transmits the request frame. As a result, the re-sending timer 74 starts measuring time and the re-sending counter 75 starts counting (step 406).

Next, the re-sending counter 75 determines whether the count has reached the set value (step 407) and notifies the frame receiver 72 of the results. The frame receiver 72 performs monitoring to determine whether the response frame is received from the user station before the re-sending timer runs out of time (step 408). If the response frame is not received and, moreover, the count recorded by the re-sending counter 75 has not reached the set value, then the frame discriminator 72a instructs the frame transmitter 71 to re-send the frame. As a result, the frame transmitter 71 re-sends the request frame to the user station (steps 405, 406). In a case where some frame is received but the received frame is not a response frame from a terminal having the same address as the destination address of the request frame transmitted immediately before, the frame discriminator 72a instructs the frame transmitter 71 to re-send the request frame. More specifically, when a frame is received from the user station, the frame discriminator 72a determines whether this frame is a response frame from an address identical with the destination address (stored in the receiver memory 72b) of the request frame transmitted just before. If the addresses do not agree and the frame is not the response frame having the correct address, the frame discriminator 72a discards this frame and instructs the frame transmitter 71 to re-send a frame. In response to the re-send command, the frame transmitter 71 re-sends the request frame. The number of re-sending operations is counted by the re-sending counter. The re-sending operation is carried out until the count reaches the set value.

On the other hand, if the correct response frame is received before the re-sending timer runs out of time, the frame discriminator 72a instructs the address table updater 67 to write the address that has been stored in the receiver memory 72b. As a result, the address table updater 67 writes this address in the non-accessing terminal address table 63 as the address of the non-accessing terminal (step 409). Further, the frame discriminator 72a instructs the re-sending counter 75, transmitter memory 71b and receiver memory 72b to clear their contents and notifies the controller 66 of end of non-accessing terminal retrieval (step 410).

Upon receiving notification of end of retrieval, the controller 66 determines whether a terminal address that has not been read out of the master address table 64 exists. In other words, the controller 66 determines whether processing for non-accessing terminal retrieval has ended with regard to all terminals that are the object of retrieval (step 411). If this processing has not ended, the controller 66 reads the next terminal address out of the address table 64 and writes this address in the transmitter memory 71b and receiver memory 72b (step 403). The processing from this step onward is repeated.

On the other hand, if the count recorded by the re-sending counter 75 is found to be equal to the set value at step 407, the re-sending counter 75 so notifies the frame receiver 72. The latter performs monitoring to determine whether the response frame is received from the user station before the re-sending timer runs out of time (step 412). If the response frame is not received even when the re-sending timer runs out of time, the frame discriminator 72a instructs the re-sending counter 75, transmitter memory 71b and receiver memory 72b to clear their contents and notifies the controller 66 of end of non-accessing terminal retrieval (step 410). Upon receiving notification of end of retrieval, the controller 66 determines whether a terminal address that has not been read out of the master address table 64 exists (step 411). If this processing has not ended, the controller 66 reads the next terminal address out of the address table 64 and writes this address in the transmitter memory 71b and receiver memory 72b (step 403). The processing from this step onward is repeated.

If it is found at step 412 that the correct response frame is received before the re-sending timer runs out of time, then the frame discriminator 72a controls the address table updater 67 so that the address stored in the receiver memory 72b is written in the non-accessing terminal address table 63 as the address of a non-accessing terminal (step 409). The processing from step 410 onward is then repeated.

If the processing for non-accessing terminal retrieval is finished with regard to all terminals that are under supervision, the controller 66 activates the master timer 65 (step 413). The above-described processing is repeated again when the master timer 65 runs out of time.

(e) Non-Accessing Terminal Notification Processing by User Station

Figure 24:
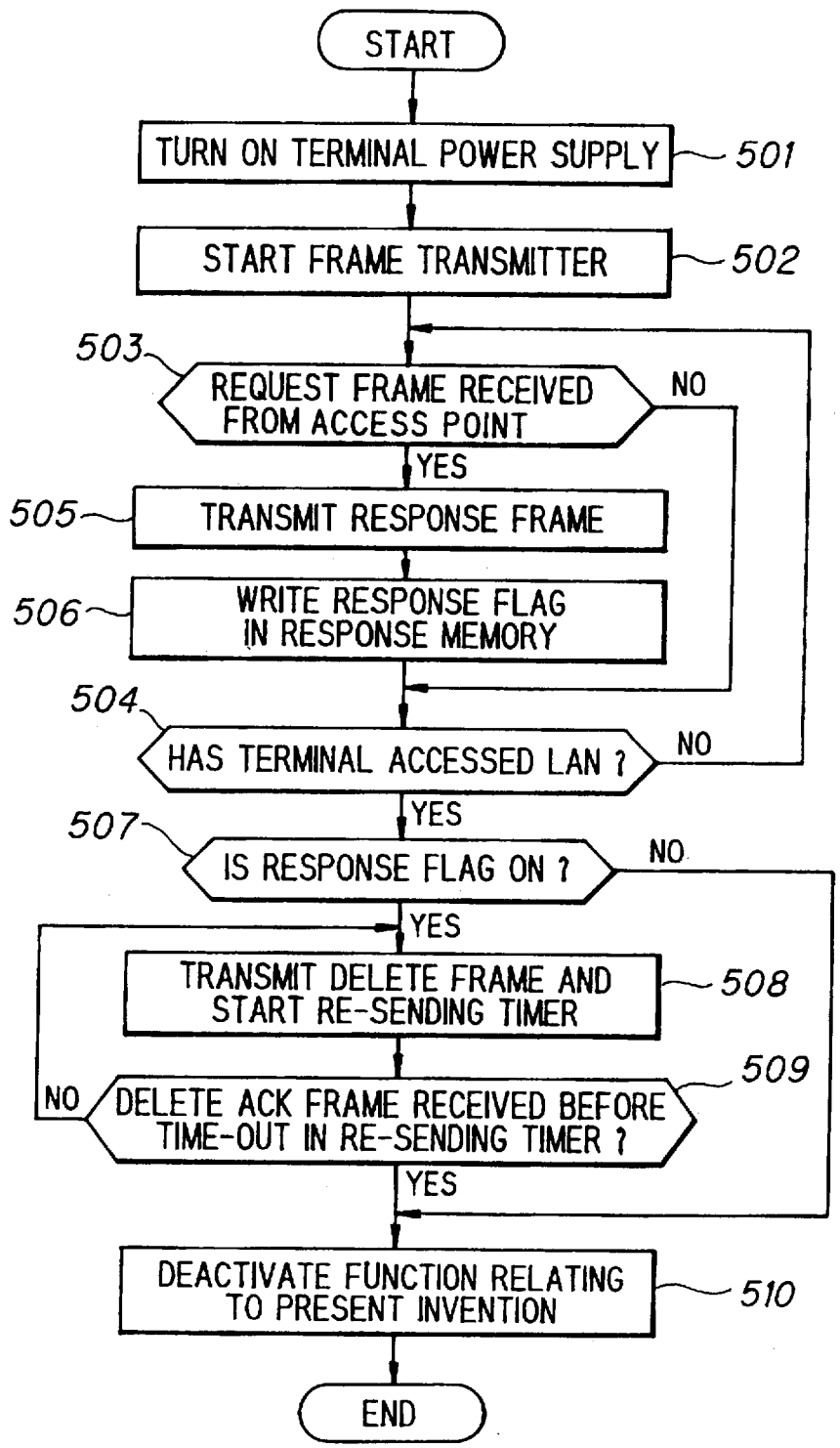
FIG. 24 is a flowchart of processing executed by a user station to notify of a non-accessing terminal.
Figure 25:
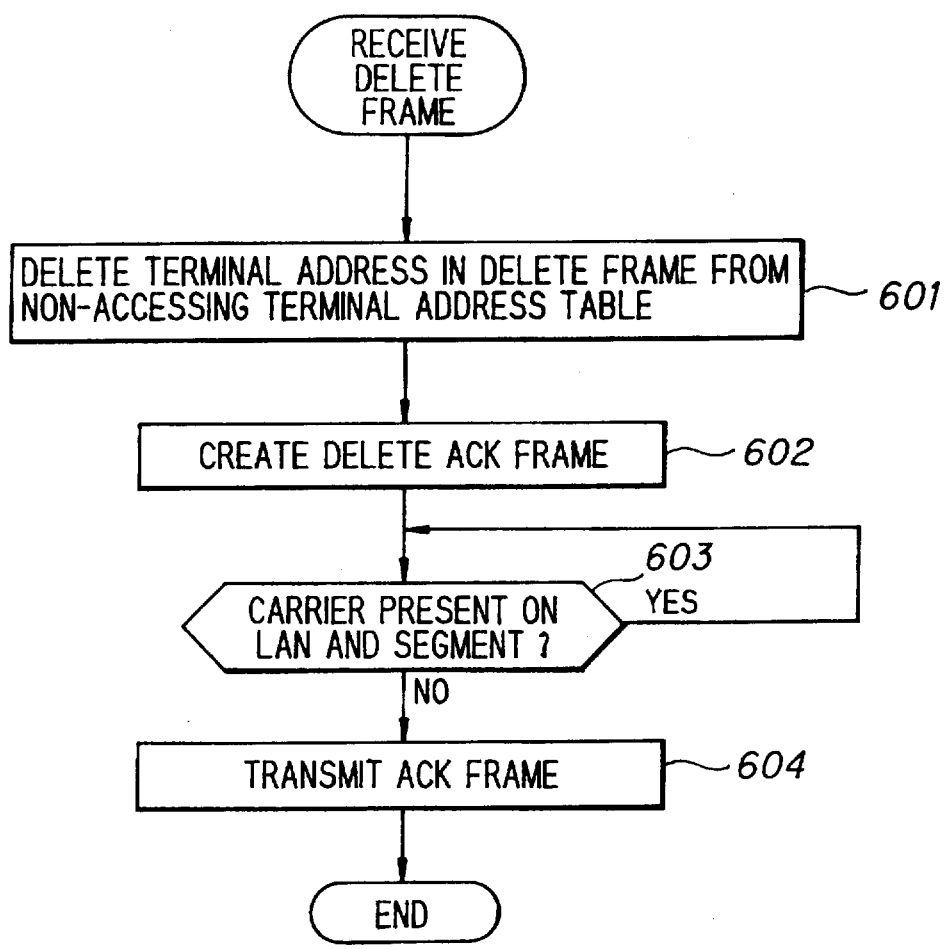
FIG. 25 is a flowchart of processing executed by the access point when a delete frame is received.

FIG. 24 is a flowchart of processing executed by a user station to notify of a non-accessing terminal.

When the power supply of the terminal 56 connected to the user station is turned on, the controller 83 (FIG. 22) activates the frame processor 28 to start the non-accessing terminal notification function (steps 501, 502). Next, when a frame is received from the access point, the frame discriminator 84 determines whether the frame is a request frame addressed to itself (step 503). If the frame is not a request frame addressed to itself, the frame discriminator 84 discards this frame. Next, the frame discriminator 84 determines whether the terminal has accessed the LAN (step 504). If the LAN is not being accessed, then the program returns to step 503 and processing from this step onward is repeated.

If a request frame addressed to itself is received, on the other hand, the controller 83 is so notified. As a result, the controller 83 instructs the frame transmitter 85 to generate and transmit a response frame. The frame transmitter 85 generates, and transmits to the access point, a response frame which includes a network address, a access point address, a terminal address and a response frame flag (step 505). As a result, the terminal 56 is written in the non-accessing terminal address table 63 of the access point as a non-accessing terminal.

Next, the frame transmitter 85 writes in the response memory 87 the fact that the response frame has been transmitted. In other words, the response flag is written in the response memory 87 (step 506). The frame transmitter 85 then determines whether the terminal has accessed the LAN (step 504). If the terminal is not accessing the LAN, then the program returns to step 503 and processing from this step onward is repeated.

When the terminal 56 accesses the LAN, a "YES" decision is rendered at step 504. When this occurs, the log-in pulse PLS enters the controller 83 from the terminal and, hence, the controller 83 checks the response flag to see whether the flag is ON. If the response flag is ON, this means that the terminal 56 has been written as a non-accessing terminal in the non-accessing terminal address table 63 of the access point. Therefore, in order to delete this, the controller 83 instructs the frame transmitter 85 to generate and transmit the delete frame. The frame transmitter 85 generates the delete frame, transmits the delete frame to the access point and starts the re-sending timer 86 (step 508). The controller 83 thenceforth performs monitoring to determine whether the delete ACK frame is received from the access point before the re-sending timer runs out of time (step 509). If the frame is not received before time runs out, the re-sending timer instructs the frame transmitter 85 to re-send the delete frame. This frame is re-sent and the re-sending timer is started.

If the delete ACK frame is received, the frame discriminator 84 so notifies the controller 83. The reception of the delete ACK frame means that the access point has deleted the terminal address from the non-accessing terminal address table 63. Accordingly, the controller 83 places the frame processor 82 in the deactivated state to conserve power and ends the non-accessing terminal notification function (step 510).

If the response flag is found to be OFF at step 507, this means that the terminal 56 has not been written as a non-accessing terminal in the non-accessing terminal address table 63. Accordingly, the controller 83 immediately places the frame processor 82 in the deactivated state and ends the non-accessing terminal notification function (step 510).

(f) Processing Executed by Access Point When Delete Frame is Received

Upon receiving the delete frame, the frame discriminator 72a of the access point so notifies the address table updater 67. As a result, the address table updater 67 deletes the terminal address contained in the delete frame from the non-accessing terminal address table 63 (step 601). The frame discriminator 72a subsequently instructs the frame transmitter 71 to generate and transmit the delete ACK frame. In response, the frame generator 71a generates the delete ACK frame, which contains the address of the destination terminal and the network address (step 602).

Next, the frame transmitter 71 checks to see whether a carrier has been detected on the wired LAN and segment (step 603). If the carrier is not detected, then the delete ACK frame is transmitted (step 604). If the carrier is detected, then the delete ACK frame is transmitted after the carrier stops being detected. It should be noted that the access point gives transmission of the delete ACK frame a higher priority than transmission of the request frame.

(g) First Modification

The foregoing relates to a case in which, when a terminal accesses the LAN, the user station transmits a delete frame and the access point receives the delete frame and deletes the address of the terminal from the non-accessing terminal address table. However, similar control can be executed without transmitting the delete frame.

More specifically, an arrangement can be adopted in which an actual data address (the address of the source transmitting actual data) is detected in the frame receiver 72 of the access point and the actual data address is deleted if it is present in the non-accessing terminal address table 63.

Figure 26:
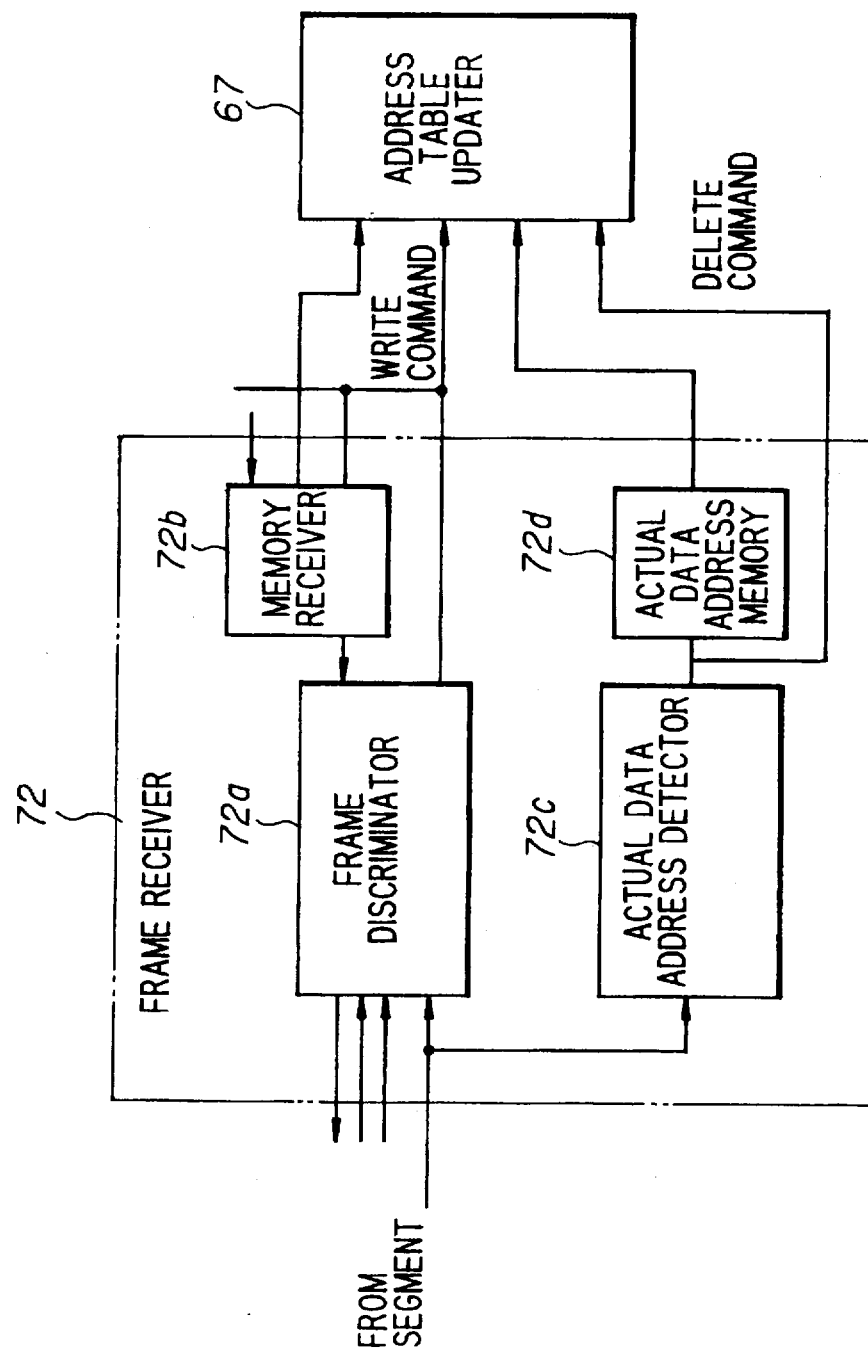
FIG. 26 is a block diagram showing the construction of a frame receiving unit in a first modification.

FIG. 26 is a block diagram showing the frame receiver according to the first modification. Components identical with those shown in FIG. 21 are designated by like reference characters. Numeral 72c an actual data address detector which, if a frame received from the user station is an actual data frame, detects the actual data address from this frame. Numeral 72d denotes a memory for storing the actual data address.

Figure 27:
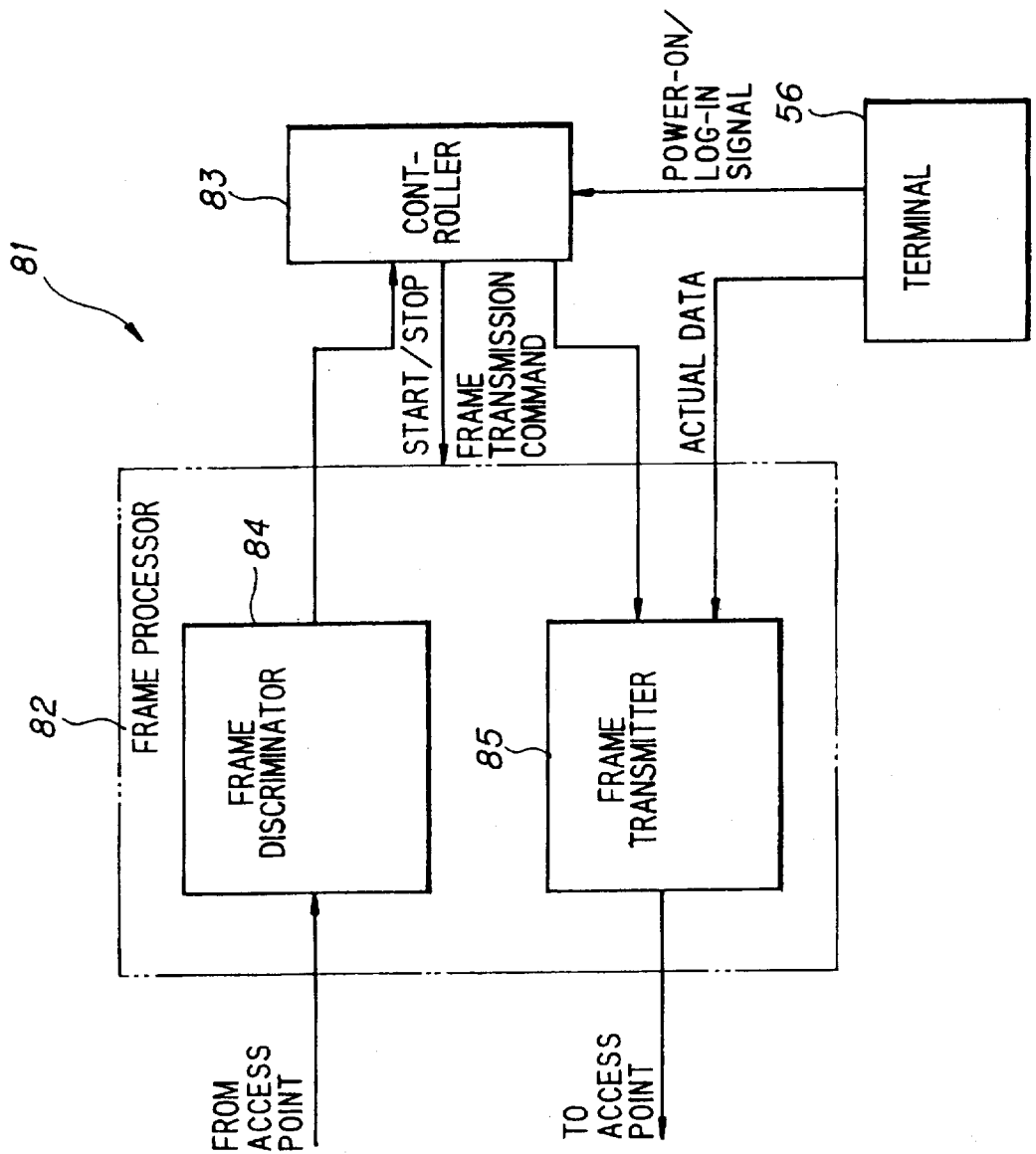
FIG. 27 is a block diagram showing the construction of a non-accessing terminal notification unit in the first modification.

FIG. 27 is a block diagram showing the construction of the non-accessing terminal notification unit 81 in the first modification. Components identical with those shown in FIG. 22 are designated by like reference characters. This arrangement differs from that of FIG. 22 in that the re-sending timer and response memory are deleted and the function for transmitting the delete frame is eliminated.

Figure 28:
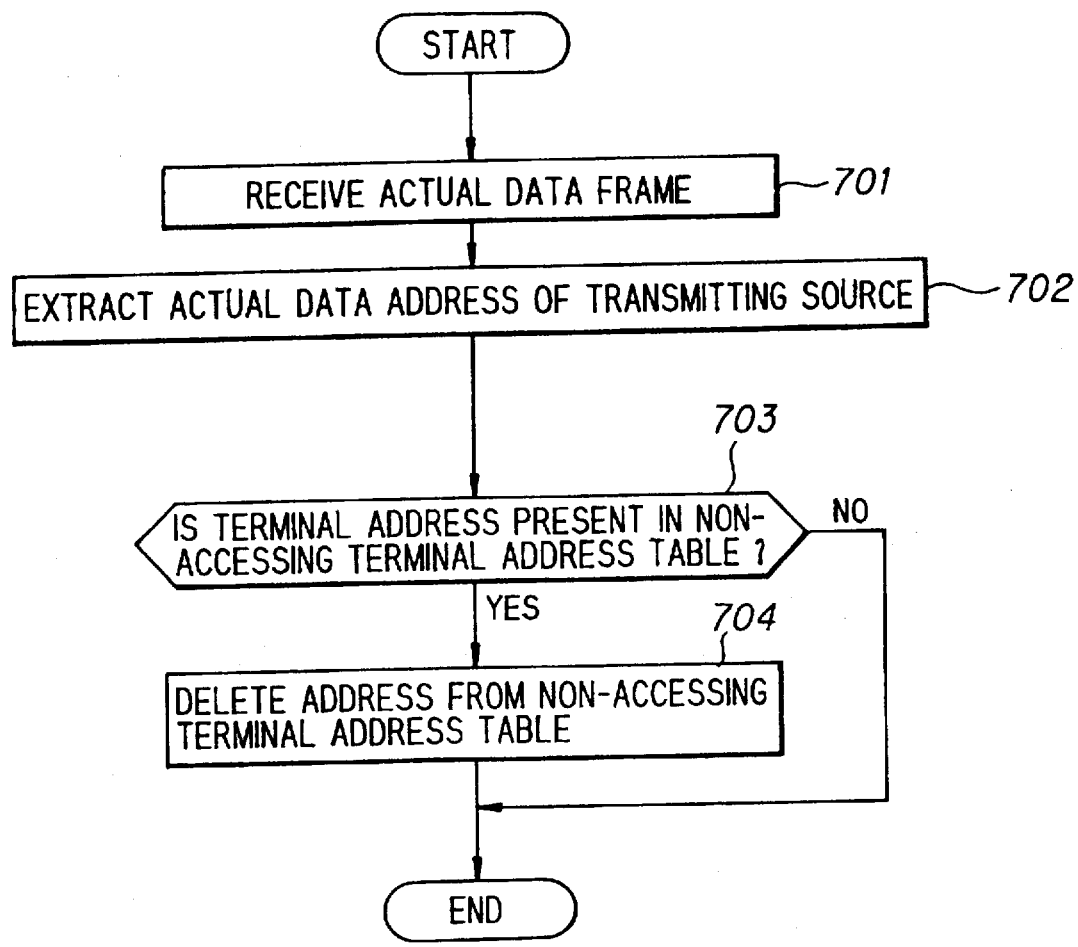
FIG. 28 is a flowchart of processing executed by the access point in the first modification.

FIG. 28 is a flowchart of processing executed by the access point in the first modification. It should be noted that processing for creating the non-accessing terminal address table 63 based upon the sending and receiving of the request frame and response frame is the same as that in the case of FIG. 21.

When the terminal accesses the LAN and transmits the actual data frame via the user station, the frame receiver 72 receives this frame (step 701). The actual data address detector 72c extracts the address (actual data address) of the source transmitting the actual data frame, stores the address in the memory 72d (step 702) and instructs the address table updater 67 to delete the address. As a result, the address table updater 67 checks to see whether the address (actual data address) stored in the actual data address memory 72d has been written in the non-accessing terminal address table 63 (step 703). If the address has been written, the updater 67 deletes this address and updates the non-accessing terminal address table 63 (step 704). It should be noted that whether the actual data address has been registered in the slave-station absence/presence management table 62 is checked. If the actual data address has not been registered, then this address is registered. If this expedient is adopted, monitoring of the user stations (terminals) that are under supervision can be performed correctly.

Figure 29:
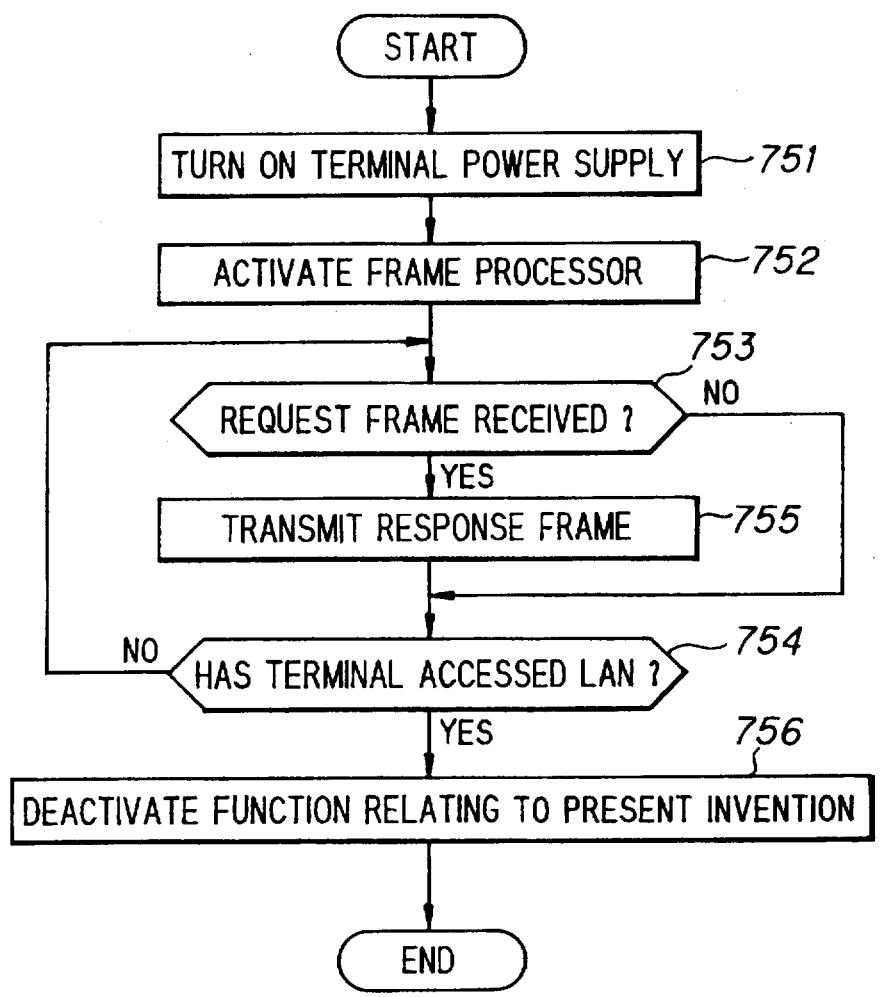
FIG. 29 is a flowchart of processing executed by the user station in the first modification.

FIG. 29 is a flowchart of processing executed by the user station in the first modification.

When the power supply of the terminal 56 connected to the user station is turned on, the controller 83 activates the frame processor 82 to start the non-accessing terminal notification function (steps 751, 752). Next, if a frame is received from the access point, the frame discriminator 84 checks to see whether the frame is a request frame addressed to its own station (step 753). If the frame is not a request frame addressed to its own station, the frame discriminator 84 discards this frame. Next, it is determined whether the terminal has accessed the LAN (step 754). If the terminal is not accessing the LAN, then the program returns to step 753 and processing from this step onward is repeated.

On the other hand, if the frame discriminator 84 receives a request frame addressed to its own station, the discriminator so notifies the controller 83. As a result, the controller 83 instructs the frame transmitter 85 to generate and transmit the response frame. The frame transmitter 85 generates, and transmits to the access point, the response frame, which contains the network address, the address of the access point, the terminal address and the response frame flag (step 755). As a result, the terminal 56 is written as a non-accessing terminal in the non-accessing terminal address table 63 of the access point.

Next, the controller 83 determines whether the terminal has accessed the LAN (step 754). If the terminal has not accessed the LAN, then the program returns to step 753 and processing is repeated from this step onward.

If the terminal 56 accesses the LAN, then the terminal naturally transmits actual communication data (actual data) toward the access point. As a result, the access point receives the actual data frame and deletes the address of the terminal 56 from the non-accessing terminal address table 63. When the terminal accesses the LAN, the controller 83 halts non-accessing terminal notification of the frame processor 82 (step 756).

(h) Second Modification

The foregoing relates to a case in which the non-accessing terminal address table 63 is cleared prior to execution of the processing for non-accessing terminal retrieval. However, the non-accessing terminal address table 63 can be updated without being cleared.

Figure 30:
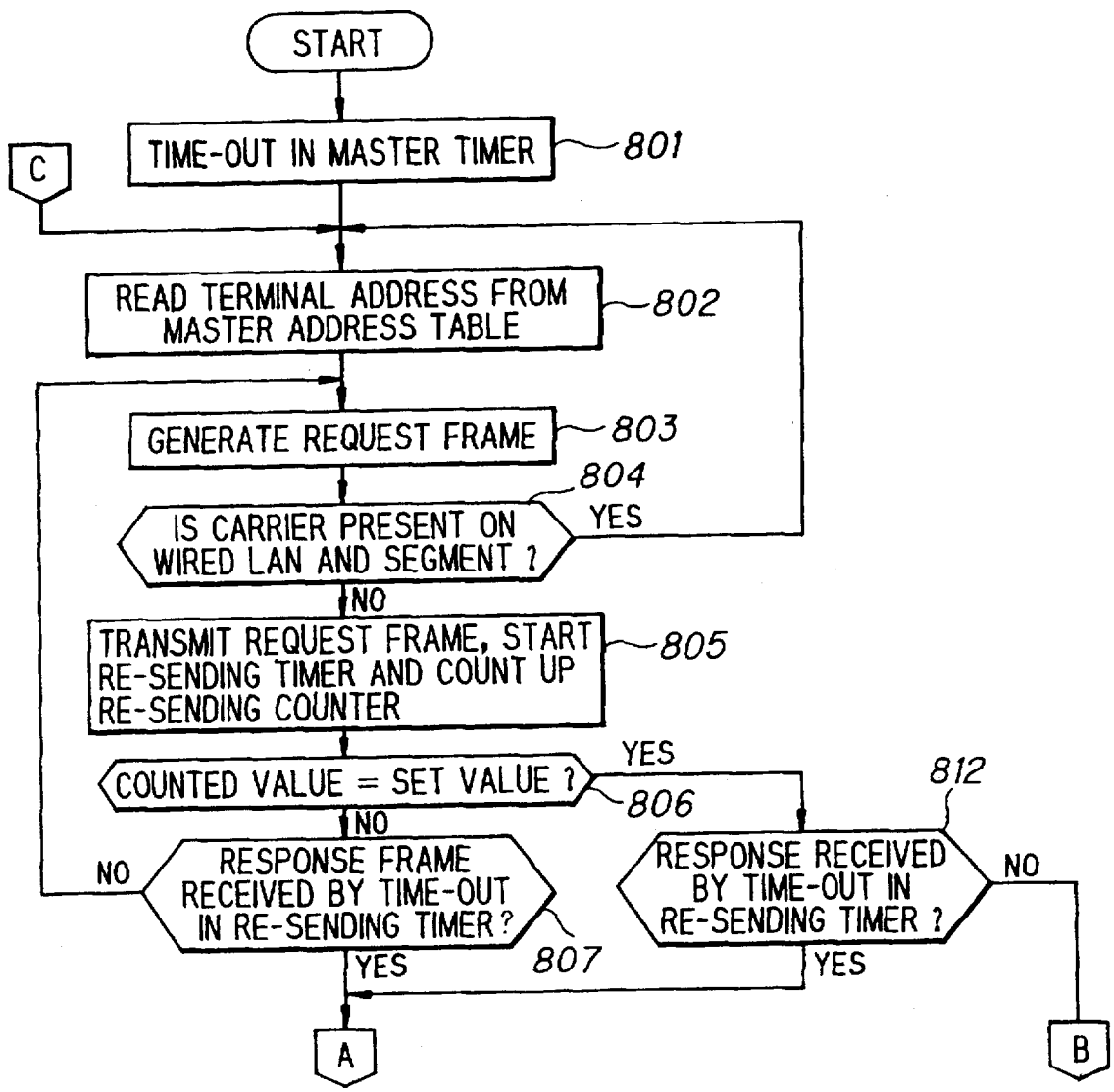
FIG. 30 is a flowchart (part 1) of the processing executed by a access point in a second modification.

FIGS. 30, 31 are flowcharts of the processing executed by the access point according to such a modification.

When the master timer 65 (FIG. 21) runs out of time (step 801), the controller 66 is actuated. The controller 66 reads out the first terminal address stored in the master address table 64 and writes this terminal address in the transmitter memory 71b and receiver memory 72b (step 802). The frame generator 71a thenceforth generates a request frame onto which the terminal address stored in the transmitter memory 71b, a network address and an address request-frame flag have been added (step 803).

After the request frame is generated, the carrier detector 73 determines whether a carrier has been detected from the segment or the backbone LAN and notifies the frame transmitter 71 of the result of detection. The frame transmitter 71 stops the transmission of the request frame during carrier detection in order to prevent frame collision on the transmission line (step 804). If the carrier is not detected, then the frame transmitter 71 transmits the request frame. As a result, the re-sending timer 74 starts measuring time and the re-sending counter 75 starts counting (step 805).

Next, the re-sending counter 75 determines whether the count has reached the set value (step 806) and notifies the frame receiver 72 of the results. The frame receiver 72 performs monitoring to determine whether the response frame is received from the user station before the re-sending timer runs out of time (step 807). If the response frame is not received and, moreover, the count recorded by the re-sending counter 75 has not reached the set value, then the frame discriminator 72a instructs the frame transmitter 71 to re-send the frame. As a result, the frame transmitter 71 re-sends the request frame to the user station (steps 803, 804).

On the other hand, if the correct response frame is received before the re-sending timer runs out of time, the frame discriminator 72a instructs the address table updater 67 to write the address that has been stored in the receiver memory 72b. As a result, the address table updater 67 determines whether the above-mentioned address has been written as the non-accessing terminal address in the non-accessing terminal address table 63 (step 808). If this address has not been written in the table, then the address of this terminal is written in the non-accessing terminal address table 63 (step 809). If the address has been written in the table, no writing operation is performed.

Next, the frame discriminator 72a instructs the resending counter 75, transmitter memory 71b and receiver memory 72b to clear their contents and notifies the controller 66 of end of non-accessing terminal retrieval (step 810).

Upon receiving notification of end of retrieval, the controller 66 determines whether a terminal address that has not been read out of the master address table 64 exists (step 811). If this processing has not ended, the controller 66 reads the next terminal address out of the address table 64 and writes this address in the transmitter memory 71b and receiver memory 72b (step 802). The processing from this step onward is repeated.

On the other hand, if the count recorded by the resending counter 75 is found to be equal to the set value at step 407, the re-sending counter 75 so notifies the frame receiver 72. The latter performs monitoring to determine whether the response frame is received from the user station before the re-sending timer runs out of time (step 812). If the response frame is not received even when the re-sending timer runs out of time, processing from step 808 onward is repeated.

However, if the response frame is not received even when the re-sending timer runs out of time, the frame discriminator 72a instructs the address table updater 67 to delete the address that has been stored in the receiver memory 72b. As a result, the address table updater 67 determines whether the above-mentioned address has been written in the non-accessing terminal address table 63 (step 813). If the address has been written, then the updater 67 deletes the terminal address from the non-accessing terminal address table 63 (step 814). If the address has not been written, however, the deletion is not carried out and processing from step 810 onward is repeated.

If the processing for non-accessing terminal retrieval is finished with regard to all terminals that are under supervision, the controller 66 activates the master timer 65 (step 815). The above-described processing is repeated again when the master timer 65 runs out of time.

(i) Examples of Application (i-1) Procedure of Service for Automatically Giving Notice of Arrival of Incoming Mail FIG. 32 is a diagram for describing the procedure of a service which automatically gives notice of the arrival of incoming mail. When incoming mail arrives, the mail server 57 (FIG. 20) connected to the backbone LAN 50 requests the access point to transfer the non-accessing terminal address table 63. In response, the access point sends the latest contents of the non-accessing terminal address table 63 to the mail server 57.

The mail server 57 checks to determine whether the destination of the received mail or the destination of unread mail (mail not read by the terminal) is present in the non-accessing terminal address table 63. If the destination is present, then an access request is sent to this terminal.

Upon receiving the access request from the mail server 57 via the access point, the user station 54 activates the reception buffer, transmits the ACK frame to the mail server 57 and waits for reception of a message.

in response to reception of the ACK frame, the mail server 57 transmits a message to the terminal via the access point in order to notify it of the fact that unread mail is present.

Upon receiving this message, the terminal causes its display screen to display the fact that an unread message is present in the mail server, thereby informing the user of the presence of mail. Further, the terminal notifies the mail server, by means of the ACK frame, of the fact that a message has been received.

(i-2) Procedure of Service for Automatically Collecting Individual Schedules

FIG. 33 is a diagram for describing the procedure of a service for automatically collecting individual schedules in group schedule management.

When an internally provided timer for collecting individual schedules runs out of time, the server 58, which is for schedule management, requests the access point to transfer the non-accessing terminal address table 63. In response, the access point sends the latest contents of the non-accessing terminal address table 63 to the server 58.

The server 58 for schedule management sends a request message to a terminal in the non-accessing terminal address table so that this terminal will transmit an individual schedule. It should be noted that an individual schedule is created by the user of the terminal in advance and is registered in the memory of the terminal.

Upon receiving the request message via the access point, the terminal transmits individual schedule information, which has been saved in the memory, to the server. The terminal also causes its display screen to display the fact that transmission has ended.

If the individual schedule information is received, or if there is no answer even after the request message is transmitted a fixed number of times, the server 57 for schedule management transmits the request message to the next terminal in the non-accessing terminal address table. If the request has been sent to all terminals in the non-accessing terminal address table, the timer for collecting individual schedules is started again and collection processing is terminated.

In accordance with the second embodiment as described above, a access point which performs the function of a control station in a wireless LAN system is provided with a function for creating and updating a non-accessing terminal address table. Accordingly, a service can be provided in which, if there is an inquiry from a server, the access point can communicate a list of the non-accessing terminals to the server, the server can automatically access a non-accessing terminal and a non-accessing terminal can automatically transfer a file to the server. Further, by deactivating the non-accessing terminal notification function of the user station when the function is not necessary, power can be conserved. Furthermore, this embodiment is applicable also to implementation of management of terminal operating time and to batch management of terminals in a segment for the purpose of automatic adjustment of time or the like.

The recent trend in terms of implementation is to design the MAC layer and physical layer as an LSI and to construct an LLC layer (logical link control sub-layer) of software using a CPU. The present method of implementation involves constructing the access point as a bridge, managing the non-accessing terminal address table by the MAC layer and managing the slave-station absence/presence management table by the LLC layer. However, in view of the size of the hardware of each management table and the complexity of processing, in a large-scale wireless LAN system it is preferred that the non-accessing terminal address table also be realized by an LLC. Further, if the degree of integration of LSIs is improved in the future and the cost of design and manufacture is reduced, it is conceivable that both tables will be mounted in the MAC layer and that it will be possible to realize the access point as a repeater equipped with a filter. If the access point can thus be realized as a repeater, it will be possible to provide the access point at a cost which is approximately half that of the case where the access point is implemented in the form of a bridge.

Thus, in accordance with the present invention, a mobile user station searches for a connectable access point periodically, for example, and stores the address of the connectable access point found in a master-station management table, this being done before the mobile user station moves from one cell to another. As a result, when it becomes necessary to switch between access points owing to movement of the user station, the connectable access point can be identified immediately by referring to the table. In other words, when a changeover is made between access points, this can be performed in a short time without executing a time-consuming search operation for a access point. This makes it possible to prevent loss of frames, addressed to the mobile user station, that arrive at the time of the changeover.

Further, in accordance with the present invention, the communication environments (e.g., the frame reception strengths) of access points are detected, and data indicating the communication environment, or a ranking conforming to the quality of the communication environment, is stored along with each access point address in the master-station management table. When it becomes necessary to connect to a new access point, a connection request is sent from the access point having the best communication environment. As a result, the access point having the best state of communication, namely the access point of the cell which is the destination of movement by the mobile user station, can be made the new access point, after which communication can be carried out in excellent fashion.

Furthermore, the present invention is such that when it becomes necessary to connect to a new access point, the connection for communication to the new access point is established while the communication path to the prevailing access point (the old access point) is maintained. A request for transfer of the data addressed to the mobile user station is then sent to the old access point via the new access point, and the old access point is instructed to cut off the communication path after the transfer has been completed. As a result, data addressed to the mobile user station, which data has been stored in the buffer of the old access point, is not discarded.

Further, the present invention is such that when the connection between the mobile user station and the new access point has been established, the connection between the mobile user station and the old access point is maintained, as a result of which redundant paths come into existence. However, of the frames addressed to the mobile user station, the new access point relays to the mobile user station only the frames from the old access point and discards the other frames addressed to the mobile user station. This makes it possible to prevent erroneous operation due to the existence of redundant paths.

Furthermore, in accordance with the present invention, the data addressed to the mobile user station accumulated in the buffer can be transferred in one batch from the old access point via the new access point. This makes it possible to shorten transfer time. The data addressed to the mobile user station can also be transferred in frame units. In such case the backbone LAN is not occupied to the same extent as in batch transfer and the buffer of the new access point is not subjected to a heavy load. Further, it is so arranged that batch transfer is performed if the quantity of data transferred is less than a stipulated quantity and frame-unit transfer if the quantity of data transferred is greater than the stipulated quantity. This makes possible a data transfer which takes both advantages into account.

Further, the present invention is such that if the new access point is connected by a network relay, the network relay alters the content of an internally provided bridge-path table based upon the transmission source address of a movement notification frame (a data-transfer request frame, for example) which the mobile user station sends to the old access point via the new access point. As a result, even if the mobile user station moves between cells, the network relay is capable of correctly sending frames, which are addressed to the mobile user station, to the backbone LAN to which this mobile user station belongs, and the mobile user station is capable of reliably receiving the frames addressed to it.

Furthermore, the present invention is such that after the connection to the new access point is established, the changeover between access points can be performed by transferring a movement notification frame only one time. This means that mobile user stations can be switched between more quickly. Further, it is so arranged that the old access point transmits notification of completion of transfer before the stored data addressed to the mobile user station is transferred. As a result, in response to reception of notification of completion of transfer, the mobile user station sends the new access point, prior to the reception of data, notification of the fact that reception is possible, thereby completing the changeover between access points in a short period of time.

Further, in accordance with the present invention, the access point is capable of ascertaining all terminals in a segment that are in the non-accessing state. If there is an inquiry from a server, the access point can communicate a list of non-accessing terminals to the server immediately. As a result, the server can be informed of the non-accessing terminals and the server can notify these terminals of whether there are messages or not, can transfer messages automatically and can execute processing for accepting schedule data set in the terminals.

Further, in accordance with the invention, a non-accessing terminal notification function of the user station can be started by introducing power to the terminal connected to the user station, and the function can be turned off in response to reception of a delete ACK. This makes it possible to conserve power consumed by the user station.

The present invention is such that when an actual data frame is received from a terminal, the address of the terminal contained in this frame is extracted, this terminal address is registered in the slave-station absence/presence management table and the terminal address is deleted from the non-accessing terminal address table. As a result, user stations that are under supervision can be managed accurately by the slave-station absence/presence management table and non-accessing terminals can be ascertained accurately by the non-accessing terminal address table.

Furthermore, in a case where a response frame in answer to a request frame is not received, the access point re-sends the request frame a preset number of times. If the response frame still is not received, the access point deletes the address of the terminal from the non-accessing terminal address table upon judging that the power supply of the terminal is off or that terminal is no longer under its supervision because of movement. By adopting this arrangement, an address table of non-accessing terminals can be created in accurate fashion.

As many apparently widely different embodiments of the present invention can be made without departing from the spirit and scope thereof, it is to be understood that the invention is not limited to the specific embodiments thereof except as defined in the appended claims.

What is claimed is:

1. A wireless LAN system comprising two or more access points connected to a LAN, each access point having a slave-station management table for managing user station addresses that are under its supervision, and user stations connected to terminals for wirelessly sending and receiving signals to and from the access points, each of said user stations searching for a connectable access point for connection thereto as a new access point when said user station moves, connecting itself to a new access point that has been found, and subsequently sending signals to and receiving signals from the new access point, wherein each of said user stations comprises:

search means for searching for a connectable access point, said searching being performed before connection to the connectable access point becomes necessary;

a master-station management table for holding the address of the connectable access point; and master/user station connection control means for sending a connection request to the connectable access point having said address held in said master-station management table when connection to the new access point becomes necessary.

2. The system according to claim 1, wherein each of said user stations has a detector for detecting communication environments between connectable access points and the user station, data indicative of said communication environments being stored, together with the addresses of the access points, in said master-station management table; and said connection control means sending the connection request to the access point having the best communication environment when connection to the new access point becomes necessary.

3. The system according to claim 2, wherein each of said user stations further has an update timer for updating contents of said master-station management table, said search means searching for a connectable access point when time in said update timer runs out.

4. The system according to claim 3, wherein said connection control means sends the connection request to access points in order starting from access points having good communication environments, said search means searches for connectable access points and registers them in said master-station management table if a connection is not established to any of the access points, and said connection control means again sends the connection request to access points in order starting from access points having good communication environments.

5. The system according to claim 1, wherein when it becomes necessary to connect to a new access point, said connection control means sends the connection request to the new access point while maintaining a communication path to an old access point still prevailing.

6. The system according to claim 5, wherein the new access point comprises:

connection control means responsive to the connection request from a mobile user station for establishing a connection between said mobile user station and its own station;

means for writing the address of the mobile user station, which has sent the connection request, in the slave-station management table; and data filter means which, until notification that reception is possible is received from the mobile user station after connection between the mobile user station and its own station is established, relays to the mobile user station only those frames from the old access point that are among frames addressed to said mobile user station and discards other frames addressed to said mobile user station.

7. The system according to claim 6, wherein said mobile user station has means which, after the connection to the new access point is established, is for sending a transfer request to the old access point, via the new access point, requesting that said old access point transfer data, which is addressed to said mobile user station and stored in a buffer of said old access point, to said mobile user station.

8. The system according to claim 7, wherein the old access point has means responsive to the transfer request for transferring to the mobile user station, in one batch or in frame units, the data addressed to said mobile user station stored in the buffer as well as notification of completion of transfer.

9. The system according to claim 8, wherein the old access point has means for discarding frames addressed to the mobile user station after all data stored in the buffer addressed to said mobile user station is transferred.

10. The system according to claim 9, wherein the mobile user station has means for sending a cut-off request to the old access point via the new access point in response to reception of the notification of completion of transfer sent from said old access point.

11. The system according to claim 10, wherein the old access point includes:

means responsive to the cut-off request from the mobile user station for deleting the address of said mobile user station from the slave-station management table and cutting off the communication path to said mobile user station; and means for notifying the mobile user station, via the new access point, of cut-off of the communication path.

12. The system according to claim 11, wherein the mobile user station has means for notifying the new access point that reception is possible after receiving notification of cut-off from the old access point, and said data filter means of the new access point relays all frames, which are addressed to the mobile user station, to said mobile user station after reception of notification that reception is possible.

13. The system according to claim 6, wherein said mobile user station has means which, after the connection to the new access point is established, is for sending notification of movement to the old access point, via the new access point, requesting that said old access point transfer data, which is addressed to said mobile user station and stored in a buffer of said old access point, to said mobile user station via said new access point and that said old access point delete the address of said mobile user station from the slave-station management table.

14. The system according to claim 13, wherein the old access point has means responsive to reception of the notification of movement for adding, to the beginning of the data stored in the buffer in order to be transferred, a cut-off frame notifying of data transfer, deletion of the address from the slave-station management table and cut-off of the communication path to the mobile user station, and transferring the data in one batch or in frame units.

15. The system according to claim 14, wherein the old access point includes:
   means for monitoring amount of slave-station data stored in the buffer of said old access point; and
   means for performing batch transfer if the amount of data is less than a set value and transfer in frame units if the amount of data is greater than the set value.

16. The wireless LAN system according to claim 1, said wireless LAN system having a plurality of LANs and a network relay interconnecting said LANs, wherein:
   said network relay has a table for storing, in correspondence with each LAN, an address of a user station or terminal under supervision, said network relay sending a frame accepted from a prescribed LAN to a LAN to which a destination user station or terminal belongs upon referring to said table;
   said user station sends a movement notification frame, which gives notification of the fact that said user station has moved, to an old access point via a new access point when a connection to the new access point has been established; and
   said network relay alters contents of said table based upon a transmitting address of the movement notification frame.

17. A user station in a wireless LAN system for wirelessly sending and receiving signals to and from access points connected to a LAN, searching for a connectable new access point when the user station moves, connecting itself to the new access point that has been found and subsequently sending signals to and receiving signals from the new access point, said user station comprising:
   means for searching for a connectable access point in advance;
   a master-station management table for holding the address of said connectable access point;
   master/user station connection control means for sending a connection request to the access point held in said master-station management table when connection to the new access point becomes necessary;
   means which, after connection to the new access point has been established, is for sending a transfer request frame to an old access point via the new access point so as to request that data, which is addressed to a mobile user station and accumulated in a buffer of said old access point, be transferred to said mobile user station;
   means for sending a disconnection request to the old access point via the new access point in response to reception of notification of completion of transfer of the data, addressed to the mobile user station, from the old access point; and
   means for sending notification that reception is possible to the new access point after notification of disconnection is received from the old access point.

18. A access point in a wireless LAN system in which the access point is connected to a LAN for wirelessly sending and receiving signals to and from user stations that are under its supervision, said access point comprising:
   a slave-station management table for managing addresses of user stations that are under supervision;
   connection control means for establishing a connection between the access point itself and a mobile user station in response to a connection request from said mobile user station;
   means for writing the address of the mobile user station that issued the connection request in said slave-station management table;
   means which, after connection between the mobile user station and the access point itself is established, relays to the mobile user station only those frames from a previously prevailing access point that are among frames addressed to said mobile user station and discards other frames addressed to said mobile user station;
   means for performing relay control of a control frame between the mobile user station and the previously access point; and
   means for relaying all frames, which are addressed to the mobile user station, after reception of notification that reception is possible sent from the mobile user station following cutting of a communication path to the previously prevailing access point.

19. The access point according to claim 18, further comprising:
   means responsive to a transfer request for transferring to the mobile user station, in one batch or in frame units, the data addressed to said mobile user station stored in the buffer as well as notification of completion of transfer;
   means for discarding frames addressed to the mobile user station after all data stored in the buffer addressed to said mobile user station is transferred;
   means which, when a cut-off request is received from the mobile user station, is for deleting the address of said mobile user station from the slave-station management table and cutting off the communication path to said mobile user station; and
   means for notifying the mobile user station, via the new access point, of cut-off of the communication path.

20. A wireless LAN system comprising access points connected to the LAN and user stations connected to terminals for wirelessly sending and receiving signals to and from the access points, wherein each access point comprises:
   a non-accessing terminal address table for storing the address of a non-accessing terminal to which power is being supplied from a power supply but which is not accessing the LAN;
   a master address table for registering the addresses of all terminals, which are the object of retrieval, in the non-accessing state;
   means for successively transmitting a request frame, which includes an address stored in said master address table as an address of a destination terminal, to user stations that are under supervision; and
   means for receiving a response frame which is sent from a user station in response to the request frame when the destination terminal is being supplied with power from a power supply but is not accessing the LAN, and registering the address of said destination terminal in the non-accessing terminal address table; and
   means for transferring the contents of said non-accessing terminal address table to a server connected to the LAN in response to a request of said server.

21. The system according to claim 20, wherein said access point further comprises means for clearing said non-accessing terminal address table periodically;
   said access point executing processing to register a terminal address in said non-accessing terminal address table is cleared.

22. The system according to claim 20, wherein said access point further comprises:
   means which, when a terminal accesses the LAN, is for receiving a delete frame, which includes a terminal address sent from the user station, and deleting this terminal address from said non-accessing terminal address terminal; and means for creating and transmitting a delete ACK frame that notifies the user station of reception of the delete frame.

23. The system according to claim 22, wherein the user station comprises:

means for transmitting the response frame to the access point when the destination terminal whose address is included in said request frame is being supplied with power from a power supply but is not accessing the LAN; and means which, when a terminal connected to the user station accesses the LAN, is for transmitting the delete frame containing the address of this terminal to the access point.

24. The system according to claim 23, wherein the user station further comprises:

means responsive to introduction of power to a terminal connected to said user station for activating a function to transfer the response frame or delete frame; and means for deactivating said function in response to reception of the delete ACK frame.

25. The system according to claim 20, wherein the access point further comprises:

a user station absence/presence management table for managing absence/presence of the user stations that are under supervision;

means which, when an actual data frame is received from a terminal via a user station in response to accessing of the LAN by said terminal, is for extracting a terminal address contained in said frame;

means for registering the terminal address in said user station absence/presence management table; and means for deleting the terminal address from said non-accessing terminal address table.

26. The system according to claim 25, wherein the user station further comprises:

means responsive to introduction of power to a connected terminal for activating a function to transfer the response frame; and means for deactivating said function in response to accessing of the LAN by said terminal.

27. A wireless LAN system comprising access points connected to the LAN, each access point having a user station absence/presence management table for managing absence/presence of user stations that are under supervision, and user stations connected to terminals for wirelessly sending and receiving signals to and from the access points, wherein the access point comprises:

a non-accessing terminal address table for storing the address of a non-accessing terminal to which power is being supplied from a power supply but which is not accessing the LAN;

a master address table for registering the addresses of all terminals, which are the object of retrieval, in the non-accessing state;

means for successively transmitting a request frame, which includes an address stored in said master address table as an address of a destination terminal, to user stations that are under supervision;

means which, when the user station has transmitted a response frame in response to the request frame because the destination terminal is being supplied with power from a power supply but is not accessing the LAN, is for receiving the response frame and registering the address of said destination terminal in said non-accessing terminal address table; and means for deleting the address of said destination terminal from said non-accessing terminal address table if a response frame in answer to said request frame is not received; and means for transferring contents of said non-accessing terminal address table to a server connected to the LAN in response to a request of said server.

* * * * *